(12) United States Patent
Mabilleau et al.

(10) Patent No.: US 9,185,000 B2
(45) Date of Patent: Nov. 10, 2015

(54) OVERLAY NETWORK TOPOLOGY SYSTEM AND A NETWORK NODE DEVICE THEREFOR

(75) Inventors: Philippe Mabilleau, Sherbrooke (CA); Simon Ayoub, Eastern Passage (CA)

(73) Assignee: SOCPRA SCIENCES ET GENIE S.E.C., Sherbrooke, QC (CA)

( * ) Notice: Subject to any disclaimer, the term of this patent is extended or adjusted under 35 U.S.C. 154(b) by 0 days.

(21) Appl. No.: 14/123,782
(22) PCT Filed: Jun. 8, 2012
(86) PCT No.: PCT/CA2012/050386
§ 371 (c)(1),
(2), (4) Date: Jan. 28, 2014
(87) PCT Pub. No.: WO2012/167383
PCT Pub. Date: Dec. 13, 2012

(65) Prior Publication Data
US 2014/0153383 A1    Jun. 5, 2014

Related U.S. Application Data

(60) Provisional application No. 61/494,618, filed on Jun. 8, 2011, provisional application No. 61/566,421, filed on Dec. 2, 2011.

(51) Int. Cl.
*H04L 12/26* (2006.01)
*H04L 12/437* (2006.01)
(Continued)

(52) U.S. Cl.
CPC *H04L 41/12* (2013.01); *F24H 7/00* (2013.01); *H02J 13/00* (2013.01); *H02J 13/0079* (2013.01);
(Continued)

(58) Field of Classification Search
CPC . H04L 12/2602; H04L 12/4637; H04L 41/00; H04L 41/048; H04L 41/06; H04L 41/0654; H04L 41/0803; H04L 41/0806; H04L 41/0813; H04L 41/0889; H04L 41/0893; H04L 41/12; H04L 47/12; H04L 49/357; H04L 63/00; H04L 63/10; H04L 67/1065

USPC ........ 370/254–258, 328, 338, 400–411, 463, 370/906–911, 222–224, 395.53, 424, 452, 370/460; 709/220–229, 249–252
See application file for complete search history.

(56) References Cited

U.S. PATENT DOCUMENTS

| 6,624,532 B1 | 9/2003 | Davidow et al. |
| 7,184,903 B1 | 2/2007 | Williams et al. |

(Continued)

FOREIGN PATENT DOCUMENTS

| EP | 1324542 A1 | 7/2003 |
| WO | WO 2004/006481 A2 | 1/2004 |
| WO | WO 2006065859 A2 | 6/2006 |

OTHER PUBLICATIONS

PCT/CA2012/050386 International preliminary report.
(Continued)

*Primary Examiner* — Tri H Phan
(74) *Attorney, Agent, or Firm* — Anglehart et al.

(57) ABSTRACT

A load management method for controlling a plurality of distributed community loads with a plurality of controllers. The controllers are connectable to a network and the distributed community loads are connectable to a power grid. The loads are controllable by a corresponding one of the controllers according to a local need and a power grid supply or a community need of the loads. A network node device adapted to communicate with other node devices of a same community within an overlay network topology system. The system has a plurality of node devices organized in a number of hierarchically linked rings. The plurality of node devices of a same ring is interconnected in groups of node devices. One of the node devices is a parent node for linking the node devices of a first ring to node devices of a second ring at another hierarchy by being a parent node to both first and second rings.

20 Claims, 34 Drawing Sheets

(51) Int. Cl.
*H04L 12/28* (2006.01)
*H04L 12/24* (2006.01)
*F24H 7/00* (2006.01)
*H02J 13/00* (2006.01)
*H04L 12/801* (2013.01)

(52) U.S. Cl.
CPC ........ *H04L 12/2825* (2013.01); *H04L 12/2834* (2013.01); *H04L 41/0654* (2013.01); *H04L 47/12* (2013.01)

(56) References Cited

U.S. PATENT DOCUMENTS

| | | | |
|---|---|---|---|
| 7,389,189 | B2 | 6/2008 | Williams et al. |
| 7,430,593 | B2 * | 9/2008 | Baldwin et al. ............... 709/223 |
| 7,715,330 | B2 * | 5/2010 | Denecheau et al. .......... 370/255 |
| 8,281,023 | B2 * | 10/2012 | Dondeti et al. ............... 709/229 |
| 2003/0093509 | A1 * | 5/2003 | Li et al. ........................ 709/223 |
| 2003/0118041 | A1 | 6/2003 | Fontana et al. |
| 2003/0145041 | A1 * | 7/2003 | Dunham et al. .............. 709/203 |
| 2004/0133689 | A1 | 7/2004 | Vasisht |
| 2006/0125422 | A1 | 6/2006 | Costa |
| 2008/0247382 | A1 | 10/2008 | Verma et al. |
| 2010/0161817 | A1 * | 6/2010 | Xiao et al. .................... 709/229 |
| 2011/0106321 | A1 | 5/2011 | Cherian et al. |
| 2013/0108263 | A1 * | 5/2013 | Srinivas et al. ................ 398/45 |
| 2014/0098702 | A1 * | 4/2014 | Fricker ......................... 370/254 |
| 2015/0117267 | A1 * | 4/2015 | Lih et al. ...................... 370/258 |

OTHER PUBLICATIONS

PCT/CA2012/050386 International search report with claims.
Aloknath de et al.,"Ring connected ring RCR topology for high speed networking analysis and implementation", Computer communcation review, ACM, vol. 21 No. 31 Jul. 1991, pp. 33-44.
EP 12796897.2 Search report and search opinion dated Sep. 23, 2014 with related claims 1-15.

* cited by examiner

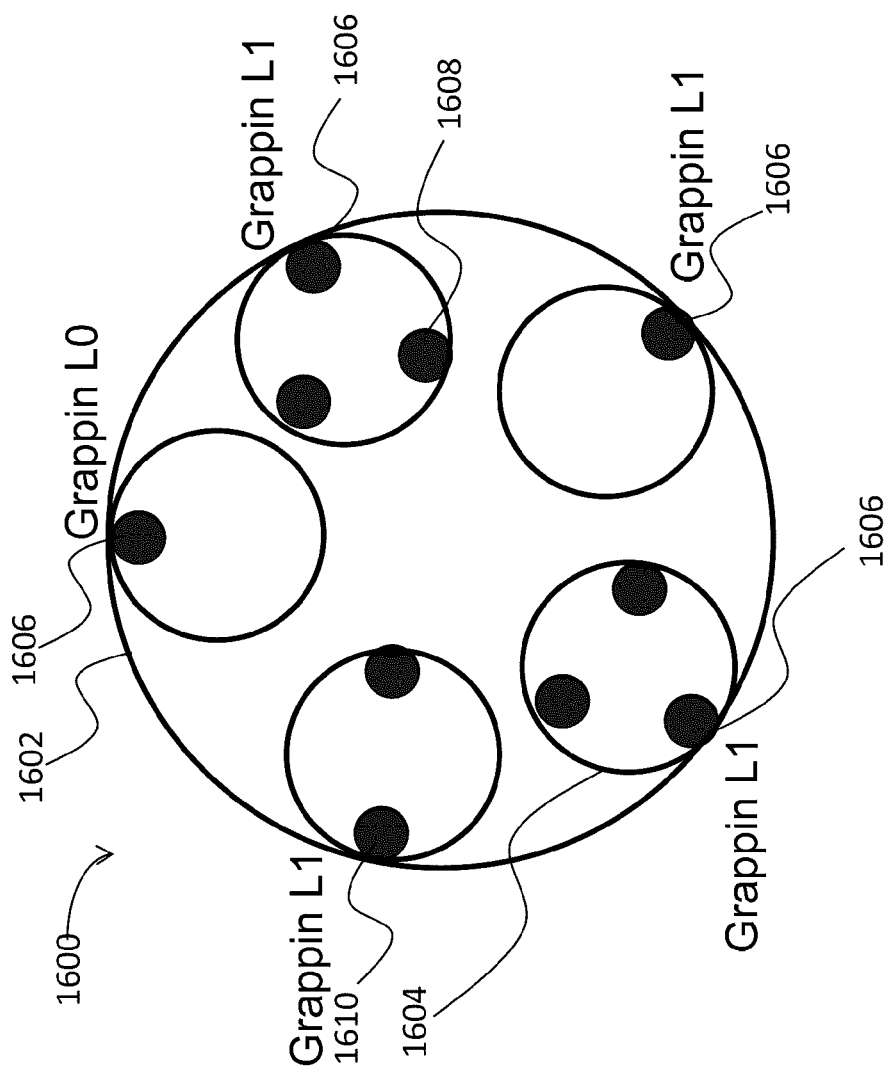

OVERLAY NETWORK TOPOLOGY SYSTEM AND A NETWORK NODE DEVICE THEREFOR

TECHNICAL FIELD

The present relates networked devices and communication between networked devices. The present also relates to a distributed load management method for controlling loads distributed in a community. More particularly the present relates to a distributed load management method for controlling the loads in order to reduce demand peaks in electricity by spreading out power consumption over time. The present further relates to an overlay network topology system and to a network node device for communicating with other node devices of a same community within the overlay network topology system.

BACKGROUND

Demand for energy is growing continuously and the actual trend is to shift some energy consumption to electricity. Within the next few years, plug-in electric vehicles will be on the market in growing numbers and without load management, the only alternative for meeting the growing demand is to build more electric power plants and reinforce the power-grid. Renewable and decentralized generations will add more challenges for load management.

Load management aims to balance the supply of electricity on the grid with the electrical load. This can be achieved by real time direct control of some appliances by the utility or by using variable tariffs to influence consumer behaviour. There are many techniques for load management, some of them acting on water heaters. Most of them use direct control where user appliances are controlled by the electric utility and control is applied to groups of users on a given schedule. So only a limited number of water heaters consume electricity at the same time during the peak period. In such techniques and without an appropriate controller, user comfort can be affected if a water heater's temperature drops below the comfort level. There is no feedback from the water heater to the electric utility in order to control each water heater separately and the water heater has no control to do it on its own.

Another known concept is the Smart Grid which is a form of network that delivers electricity from suppliers to consumers using two-way digital communications to control appliances at consumers' homes for saving energy, reduce costs and increase reliability and transparency if the risks inherent in executing massive information technology projects are avoided. The Smart Grid is envisioned to overlay the ordinary electrical grid with an information and net metering system that includes smart meters.

The idea of communications from suppliers to consumers to control appliances is not new, and systems have been implemented using analog technology for many years. The growth of an extensive digital communication network for the internet has made it practical to consider a more sophisticated type of electric Grid. The increased data transmission capacity has made it conceptually possible to apply sensing, measurement and control devices with two-way communications to electricity production, transmission, distribution and consumption parts of the power grid at a more granular level than previously. These devices could communicate information about grid condition to system users, operators and automated devices, making it possible for the average consumer to dynamically respond to changes in grid condition, instead of only utilities and very large customers.

Like existing utility grids, a Smart Grid includes an intelligent monitoring system that keeps track of all electricity flowing in the system, but in more detail. Like the existing grid, it also has the capability of integrating renewable electricity such as solar and wind, but has the potential to do so more effectively. When power is least expensive the user can allow the Smart Grid to turn on selected home appliances such as washing machines or factory processes that can run at arbitrary hours. At peak times it could turn off selected appliances to reduce demand.

Smart Grid deployment is under way in many countries. This transformation enables new capabilities that involve an important change regarding load management. With the Smart Grid, electric utilities are deploying advanced meters and devices with microprocessors and two-way communication that allow it to better control the grid, to interact with the customers and to collect real time information about their electricity usage, etc.

Microsoft presents their vision of Smart Grid, referring to it as "smart energy ecosystem", by proposing a "Smart Energy Reference Architecture" (SERA). Web services are part of their vision. Whirlpool proposed architecture called Whirlpool Smart Device Network (WSDN) that includes the Internet as part of the communication infrastructure. Cisco delivers an IP-based communications infrastructure for the Smart Grid. Lately, they announced a partnership with Itron who will embed Cisco IP technology within its OpenWay® meters.

However, the transformation to the grid presents a large challenge for the implementation of load management measures, not to mention the challenges added by plug-in electric vehicles and decentralized electric generations.

An overlay network is a virtual network that is adapted to run on top of a physical network. It is used for a wide number of applications such as media streaming, peer-to-peer file sharing, multicast communication, virtual reality, quality of service (QoS), video and voice calls (VoIP), etc. Participant nodes are adapted to create and build the virtual network. Moreover, the participant nodes are adapted to organize themselves in a topology that allows them to exchange information.

The topology is chosen according to the communication protocols and applications that use the overlay network. For instance, resilient overlay networks preferably require topologies that have a higher level of redundancy with respect to the physical network. Video streaming and file sharing applications preferably require topologies that respect the capabilities of the source.

A network topology can be unstructured or structured. In unstructured systems there are redundant connections that improve the quality of service but increase the overhead necessary to maintain a loop free structure. In structured systems it is easier to have a loop free structure and a simple routing algorithm.

Depending on the applications and protocols some topologies may be better adapted than others; a tree topology decreases the communication delay but presents a center point failure and is not optimized for many-to-many communication. A ring topology increases the number of links but the communication delay increases with the number of nodes in the ring.

An overlay network topology can be hierarchical, having ordinary nodes on one level and super nodes on another level. It can be hierarchical and structured such as a cubic or a tore network topology. However, none of these topologies is well adapted for applications where millions of nodes need to send continuously flowing messages to the entire network. This functionality is required for some applications where a large number of intelligent communicating devices such as intelligent sensors or controllers exchange information continuously in order to achieve a common goal.

SUMMARY

It has been discovered that it is possible to balance power network load drawn by a community of loads that are connected to a power grid while still maintaining an acceptable level of comfort by individually controlling the load according to various power grid conditions. Each load can be given semi-autonomous or fully autonomous control over the choice to draw power or to postpone drawing power as a function of the needs of other loads and/or the power grid's ability or capacity to supply power.

In the following, it shall be understood that the power consuming load or a distributed community load can be any type of load that is adapted to maintain an acceptable temperature over a period of time even after having been disconnected from the power grid. In some embodiments, the load is a water heater. In other embodiments, the load is a heating system or an air conditioning system. In yet another embodiment, the load is an electric thermal storage system. In a further embodiment, the load is a combination of types of loads that are electrically connected to a power grid.

According to one aspect, there is a plurality of loads distributed in a community that are each electrically connected to a power grid. Each of the plurality of distributed community loads is controllable by a corresponding controller. The controller can be any type of electronic device that is connectable to a network such as an Internet network or any other type of network.

According to one aspect, the controller is an electronic circuit, such as an electronic circuit board having at least one network port for two-way communication, one input port for measuring a local need parameter (i.e. temperature, battery charge, etc.) and one output port for controlling the device operations. In addition, the controller can have a control signal port for setting a mode of operation, when more than one mode of operation is required. The electronic circuit can have a processor for processing information data of the input ports and determining therefrom a power consumption instruction for the corresponding load according to the mode of operation, if applicable.

According to another aspect, there is a load management method for controlling a plurality of distributed community loads with a plurality of controllers that are connectable to a network. The plurality of distributed community loads are each connected electrically to a power grid and can be controlled by a corresponding one of the plurality of controllers.

Each of the plurality of controllers is adapted to collect a local data from the corresponding load. The local data is indicative of at least a local need parameter.

In the following, it shall be understood that the local need parameter can be any type of parameter or combination of parameters that represent an actual need of the load's subject such as a water temperature in a water heater, a room temperature in the case where the load is a heating system or an air conditioning system, a storage temperature in the case of an electric thermal storage system, a battery charge level in the case of a rechargeable battery such as those used in automotive vehicles, a quantity of coolant material that is in a particular phase in the case of a heat exchanger using a bi-phase coolant etc.

The local need parameter can also represent a predetermined acceptable threshold or a combination of predetermined acceptable thresholds such as a minimum or maximum temperature, battery charge level or quantity of coolant material in a particular phase. In the case of a water heater, the local need parameter can represent a minimum water temperature. In the case of a heating system, the local need parameter can represent a minimum room temperature. In the case of an air conditioning system the local need parameter can represent a maximum room temperature. In the case of an electric thermal storage system, the local need parameter can represent a minimum thermal storage temperature. In the case of a rechargeable battery, the local need parameter can represent a minimum battery charge. Also, in the case of a rechargeable battery for a vehicle, the local need parameter can represent a combination of a minimum battery charge, a time of use and a minimum distance of travel. In the case of a heat exchanger, the local need parameter can represent a minimum quantity of coolant material in a particular phase.

In one embodiment, the local need parameter is a temperature of a hot water heater that is measured by a sensor at a single position within the water heater tank. Using this measured temperature, the controller decides when to turn on or off the electric consumption of the water heater.

The sensor could be positioned on an exterior wall of the tank. The sensor could be positioned where the water temperature is representative of the temperature of water exiting from the tank, such as near a top position of the tank.

In an alternate embodiment, the local need parameter is a temperature of a hot water heater that is measured at multiple positions within the water heater tank. There are several temperature sensors located at various positions in the water heater tank to measure the temperature at those positions. A single temperature is then derived from the multiple measurements and the controller is then adapted to use that single temperature to turn on or off the electric consumption of the water heater.

Each of the plurality of controllers is adapted to receive a community data from at least one other node of the network. The community data is indicative of at least one of a power grid supply parameter or a community need parameter of the plurality of distributed community loads.

In the following, it shall be understood that the power grid supply parameter can be any type of parameter that represents an actual state of the power grid such as an available power on the grid or a predetermined power consumption value such as a power consumption quota or a power consumption price for a predetermined period of time, etc.

In the following, it shall also be understood that the community need parameter can be any type of parameter that represents an actual state of the other loads of the plurality of distributed community loads such as a water temperature in a water heater, a room temperature in the case where the load is a heating system or an air conditioning system, a storage temperature in the case of an electric thermal storage system, etc. The community need parameter can further represent a power consumption need of each of the plurality of distributed community loads or a ranking of an actual state of the other loads or of all the distributed community loads.

Based on the collected local data and the received community data, each of the plurality of controllers is adapted to set a power consumption of its corresponding load for reducing the power consumption of the load while maintaining an acceptable comfort level.

According to one embodiment, each of the plurality of controllers is adapted to set the power consumption of its load to an active status or to allow load power consumption when a value of the local need parameter is beyond an acceptable local threshold and a value of the power grid supply parameter is within an acceptable supply range.

There are various ways of applying this method to various types of loads. In one case where the loads are water heaters, the controller is adapted to turn on its water heater when the water temperature reaches a value that is below a predetermined threshold only if the power available in the grid is within an acceptable range and/or only if the price of power is within an acceptable range at that period of time.

According to another embodiment, each of the plurality of controllers is adapted to set the power consumption of a corresponding load to an active status when a value of the local need parameter is beyond an acceptable local threshold and a value of the community need parameter is within an acceptable community threshold.

Again, there are various ways of applying this method to various types of loads. In one case where the loads are water heaters, the controller is adapted to turn on its water heater when the water temperature reaches a value that is below a predetermined threshold only if the water temperature is among the lowest in comparison with the water temperature of the other loads connected to the grid.

According to another embodiment, each of the plurality of controllers is adapted to set the power consumption of a corresponding load to an active status when a value of the local need parameter is beyond an acceptable local threshold, a value of the community need parameter is within an acceptable community threshold and the power grid supply parameter is within an acceptable supply range.

Another object of the present is to provide a distributed communication and management system that permits reducing message transmission delay while assuring reliability and scalability. Another object of the present is to provide a distributed communication and management system that simplifies and lowers the cost of managing such system.

According to one aspect the present relates to a network node device for communicating with other node devices of a same community within an overlay network topology system. The topology system has a plurality of node devices organized in a number of p hierarchically linked ring network levels, where p ranges from 0 to p−1. The plurality of node devices of a same ring is interconnected in groups of n node devices, where n ranges from 0 to n−1. One of the n node devices is a parent node for linking the n node devices of a first ring to node devices of a second ring at another hierarchy by being a parent node to at least the second ring.

The node device has a network connection interface to communicate over an interconnected network of node devices. The interface is related to a network address.

The node device further has a registry of connectable node devices adapted to store node device network address and identifiers each representing a node device of the community. The identifiers are indicative of the ring network level and ring network position of the corresponding node device according to the overlay network topology.

The node device further has a registry update manager adapted to modify the registry for handling a change in the community due to drops, adds and moves of node devices that affect the registry The node device further has a forwarding message manager adapted to receive an incoming message via the network connection interface and to handle the incoming message in accordance with a content of the incoming message and the registry. When the network node device is a parent node the forwarding message manager is adapted to send an outgoing message according to the incoming message to a plurality of node devices of the registry, each having a node position on a different one of the rings that are linked by the network node device. When the network node device is not a parent node the forwarding message manager is adapted to send the outgoing message according to the incoming message to another node device of the same ring network level according to the registry.

According to another aspect the present relates to an overlay network topology system that has a node device as defined above.

BRIEF DESCRIPTION OF THE DRAWINGS

The invention will be better understood by way of the following detailed description of embodiments of the invention with reference to the appended drawings, in which:

FIG. 16 is a representation of a two level ring-tree topology, according to one embodiment;

DETAILED DESCRIPTION

The present relates to a distributed method for the load management of water heaters. This method assumes that water heaters of a city or a province, belonging to the same electric utility, are equipped by a communications-enabled controller. The controller allows them to communicate with each other via any network such as the Internet, in a peer to peer way, a Smart Grid's two way communication system or any other communication infrastructure. When water heaters are able to communicate with each other, they can assure a distributed load management without the intervention of the electric utility or any direct control. The decision to turn on and off is taken by the water heater itself using information received from other water heaters about their electrical energy needs and from the electric utility about the general load on the grid.

Figure 1A:
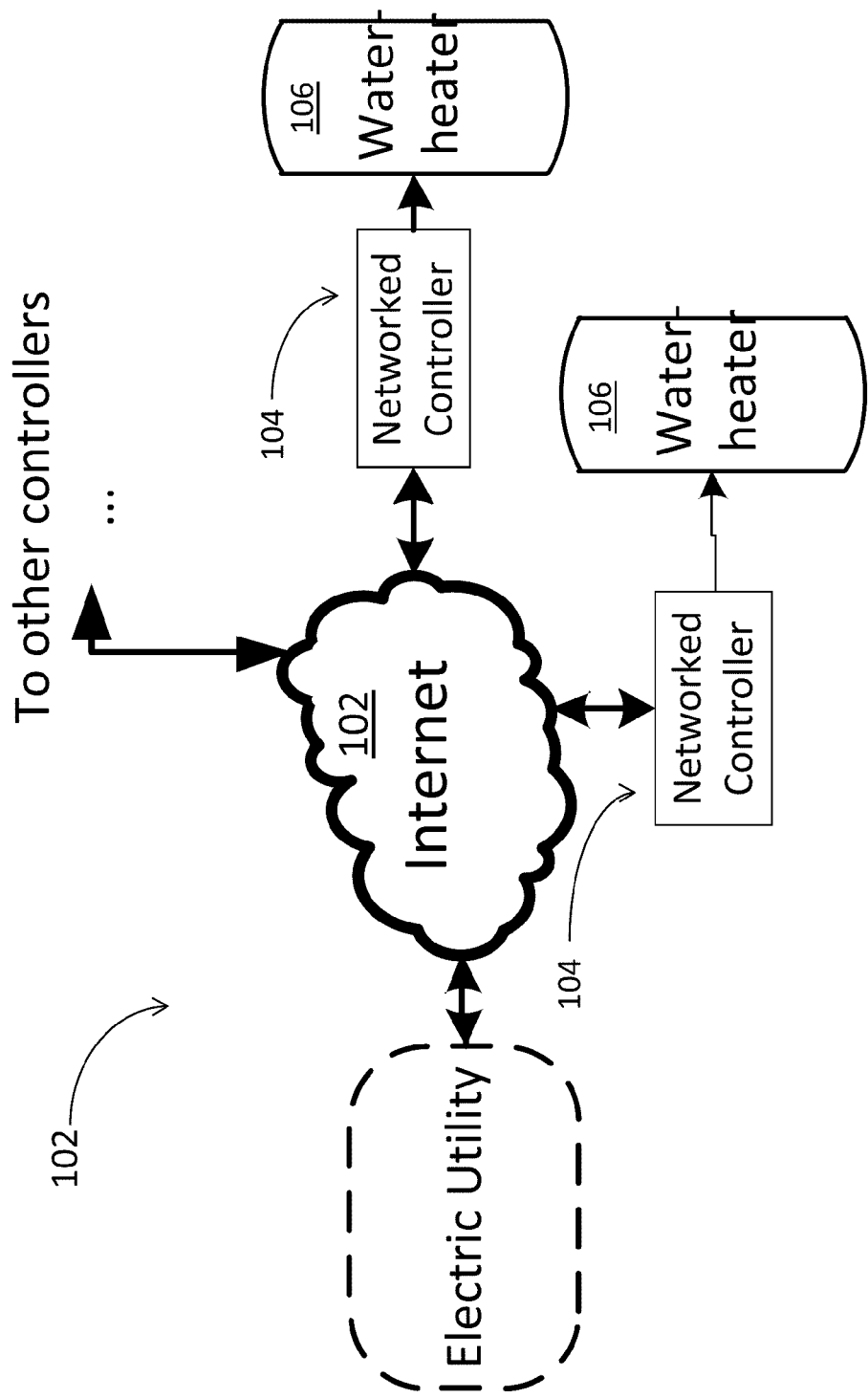
FIG. 1A is a block diagram of an Internet peer-to-peer water heater network for load management, according to one embodiment.

FIG. 1A shows an illustration of an Internet peer-to-peer water heater network 102 for load management. This network 102, not addressed here, must support communication between thousands and up to millions of water heaters of the same electric utility. A networked controller 104 can be embedded in the appliance or it can be part of a home gateway and it may use the residential Internet connection. A skilled person will understand that it is possible for the method to take advantage of the principle of storing energy in thermal form. This principle is used in some other energy industries (e.g., space heating and cooling). Energy is stored during off-peak times in thermal energy storage for later use during times of peak demand. In such techniques, consumption of electricity will occur during off-peak times where the need for electricity is lower and in some cases the price of the electricity is cheaper. For example, electrical energy can be stored in Electric Thermal Storage to be used later for space heating during the peak-demand period; there is no consumption during peak-demand. Another example; ice can be produced during the night (an off-peak time) and used to cool environments during the day. These techniques don't necessarily use direct control.

Figure 1B:
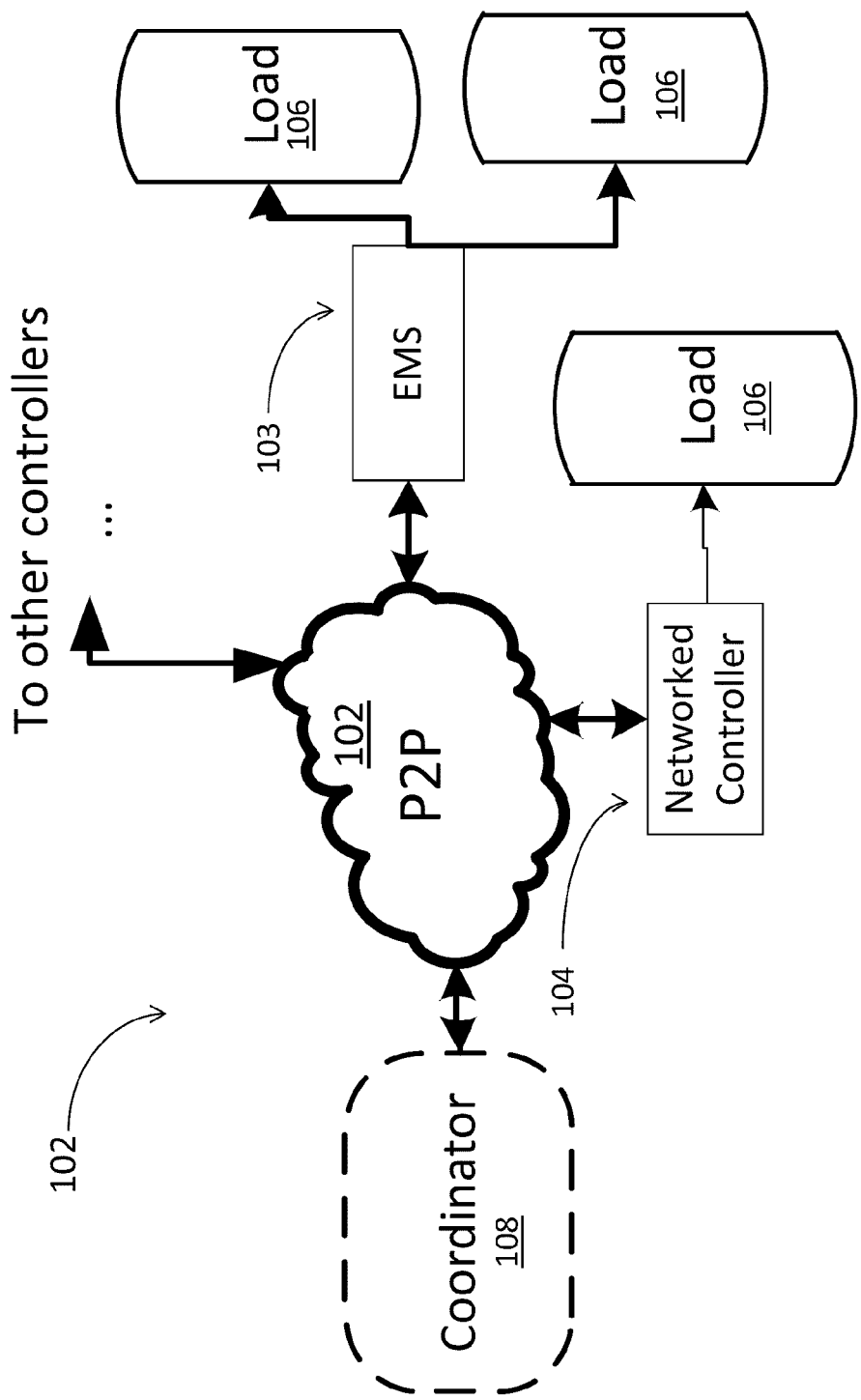
FIG. 1B is a block diagram of an Internet peer-to-peer load network for load management, according to one embodiment.

According to an alternate embodiment, there is presented in FIG. 1B a block diagram of a peer-to-peer network 102 for load management. In this network 102 an energy management system EMS 103 is adapted to control a plurality of loads 106 and a network controller 104 is adapted to control a single load 106. A coordinator 108 is also connected to the network 102, the coordinator 108 may be any one of an electric utility, a systems operator, a balancing authority, a virtual power plant, etc.

Note that the peer-to-peer network 102 may use any type of communication network such as an internet network, a cellular network, etc.

Electric Water Heater Model

The water temperature in the water heater 106 is very stratified with height; so that the hot-water temperature exiting from the top of the tank is very different from the average temperature. In the present, the average water temperature of the water heater is being considered. The average water temperature is evaluated by the differential equation (1) developed and based on works known in the art. This water heater model is known in the art, however the approach of the present is different, as will be shown in the following section.

Elemental Electric Water Heating Stochastic Model

For each water heater, the water temperature must be monitored at all times. Solving the differential equation (1) provides the temperature x(t) at any moment.

$$\frac{dx(t)}{dt} = -a[x(t) - x_a(t)] - A\kappa(t) + Rm(t)b(t) \quad (1)$$

Where x(t) is the average tank water temperature at time t, $x_a(t)$ is the ambient temperature, a is the thermal resistance of the tank walls, A(t) is the rate of energy extraction when water is in demand, κ(t) is the normalized (1-0) hot water demand jump process, R is the power rating of the heating element, m(t) is the thermostat binary state (1 for On, 0 for Off), b(t) is the on-off control used by the control-algorithm. The switching of q(t) is characterized by the following transition probabilities:

$$Pr[\kappa(t+h)=1|\kappa(t)=0]=\alpha_0 h$$

$$Pr[\kappa(t+h)=0|\kappa(t)=1]=\alpha_1 h$$

Where $\alpha_0$ and $\alpha_1$ are positive and h is an infinitesimal time increment.

From equation (1) the following equation (2) is obtained:

$$x(t)=e^{-at}C+e^{-at}\int_0^t e^{a\tau}(-A(\tau)\kappa(\tau)+Rm(\tau)b(\tau)+ax_a)d\tau \quad (2)$$

Where C is obtained considering that at the initial time, x(t) is equal to the ambient temperature.

In a simulation of the dynamic water demand over 24 hours the $\alpha_1$ was considered to be constant and the $\alpha_0$ value was varied every 30 minutes. Therefore, in 24 hours there were 48 different values of $\alpha_0$. The $\alpha_0$'s variation were set according to the same curve as a daily hot water demand curve: when the hot water demand is high, the probability to extract hot water is also high, and when the hot water demand is low, the probability to extract hot water is also low. The $\alpha_0$'s variation where also set according to the electric consumption curve, as the curve of daily hot water demand is similar thereto. So, $\alpha_0$ also follows the same curve pace of the electric consumption.

This method considers that the probability for the consumer to start extracting water varies in time following the curve of the electricity demand and the consumer stops using water with a constant probability. To simulate different profiles it was only required to change the 48 values of $\alpha_0$ in a way that it follows the pace of the needed profile. It was therefore possible to generate any consumption profile by varying the values of $\alpha_0$ over 24 hours.

Water Heater Simulation

Figure 2:
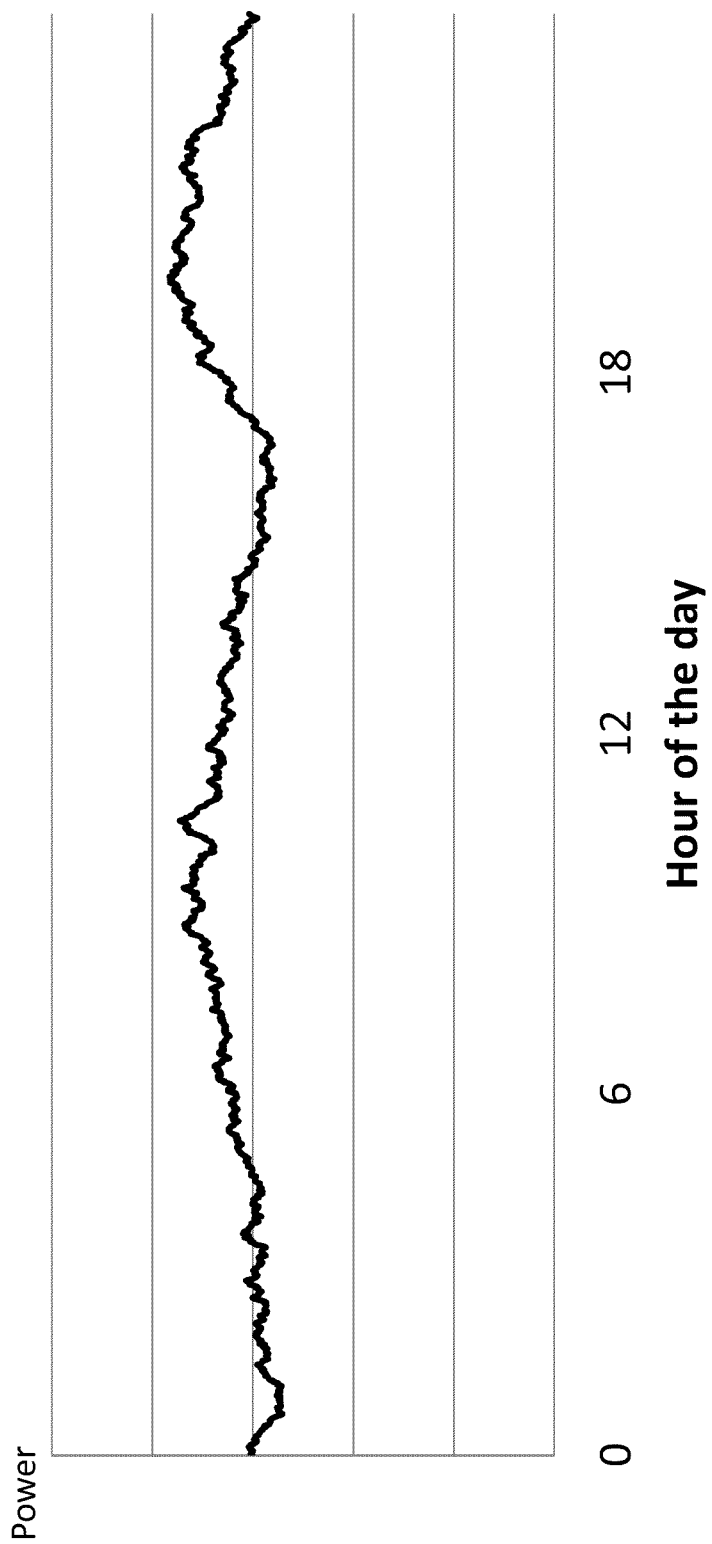
FIG. 2 is a graph representing a sample profile of 10,000 water heaters where a hot water consumption peak is noticeable at 7 am and at 7 pm, according to one embodiment.

For simulation purposes, equation (2) was programmed in Java programming language, according to households with a family of 3 people having a 52 gallon sized water tank and 4.5 kW heating elements. In such families, it was determined that the water consumption is about 266 liters per day with an average of 17 water events per day. The thermostat set point is 60° C. with a 5° C. deadband. The parameters of the water heater model associated to this type of household are:

R=0.3279° C./min
a=0.000156 min$^{-1}$
A=1.29° C./min
$\alpha_0$=0.012 min$^{-1}$
$\alpha_1$=0.32 min$^{-1}$ In the simulation the time increment h is set to 1 min and the value of $\alpha_1$ doesn't change with time, as mentioned earlier. The 48 $\alpha_0$'s values were calculated according to the profile to be simulated and the $\alpha_0$'s value is considered to be an average. To simulate a sample profile where there is a peak at 7 am and another one at 7 pm, an $\alpha_0$'s value was chosen in order to follow the pace of a typical profile, and a simulation of 10,000 water heaters was run as shown in FIG. 2.

All simulated water heaters start with initial temperature value of 20° C. The simulation was run for 48 hours in order to reach a steady state and the data of the last 24 hours were analysed.

Figure 3:
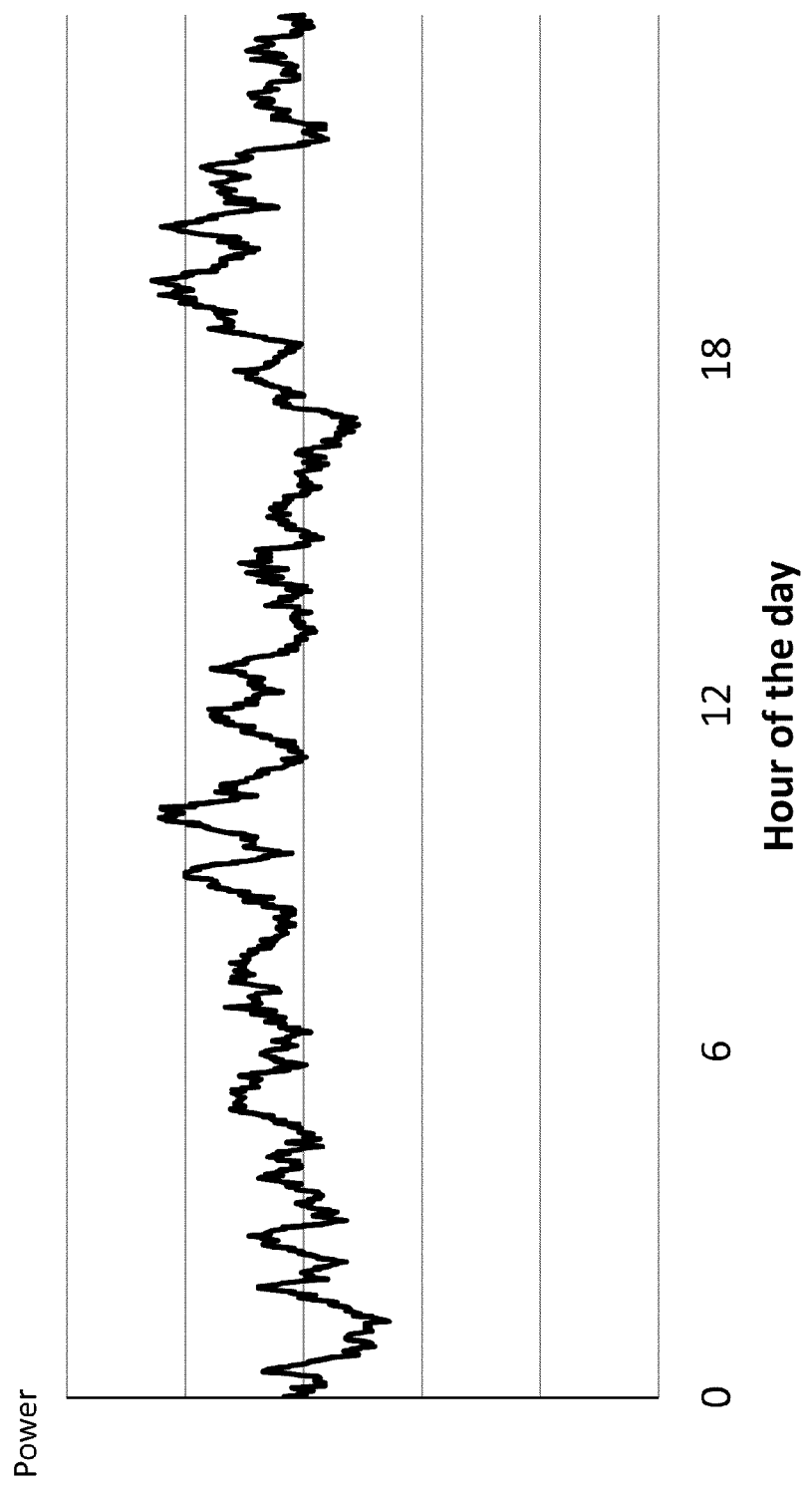
FIG. 3 is a graph representing a sample profile of 1,000 water heaters where a hot water consumption peak is noticeable at 7 am and at 7 pm, according to one embodiment.
Figure 4:
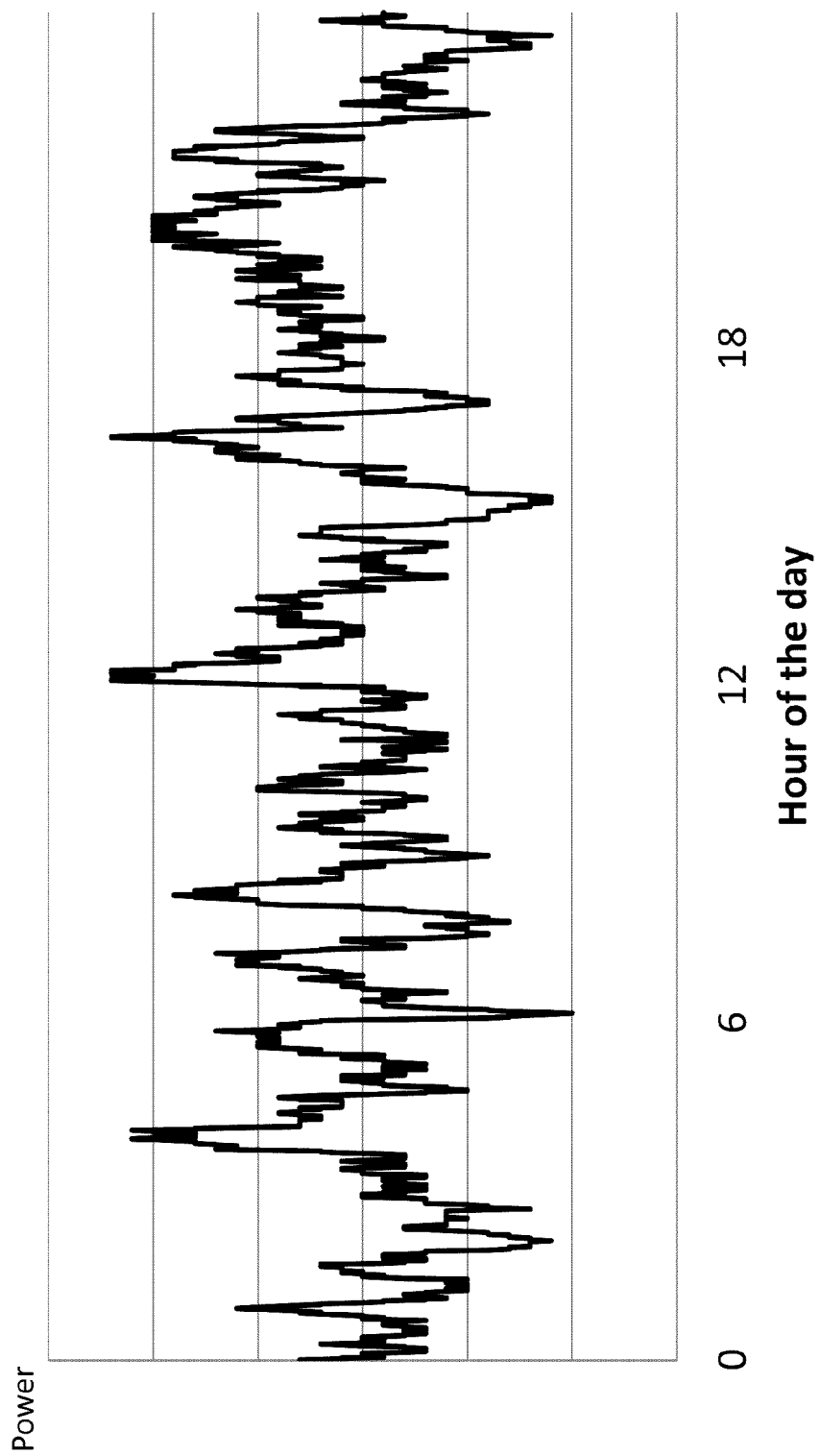
FIG. 4 is a graph representing a sample profile of 100 water heaters where a hot water consumption peak cannot be distinguished, according to one embodiment.

FIGS. 3 and 4 show simulations for the sample profile using 1,000 and 100 simulated water heaters. It is noticed that with a small number of simulated water heaters the shape of the sample profile gets lost. This is caused by the statistical aspect of the elemental water heater model. Consequently, the following results were simulated with 10,000 water heaters.

Water Heater Distributed Method

Figure 5A:
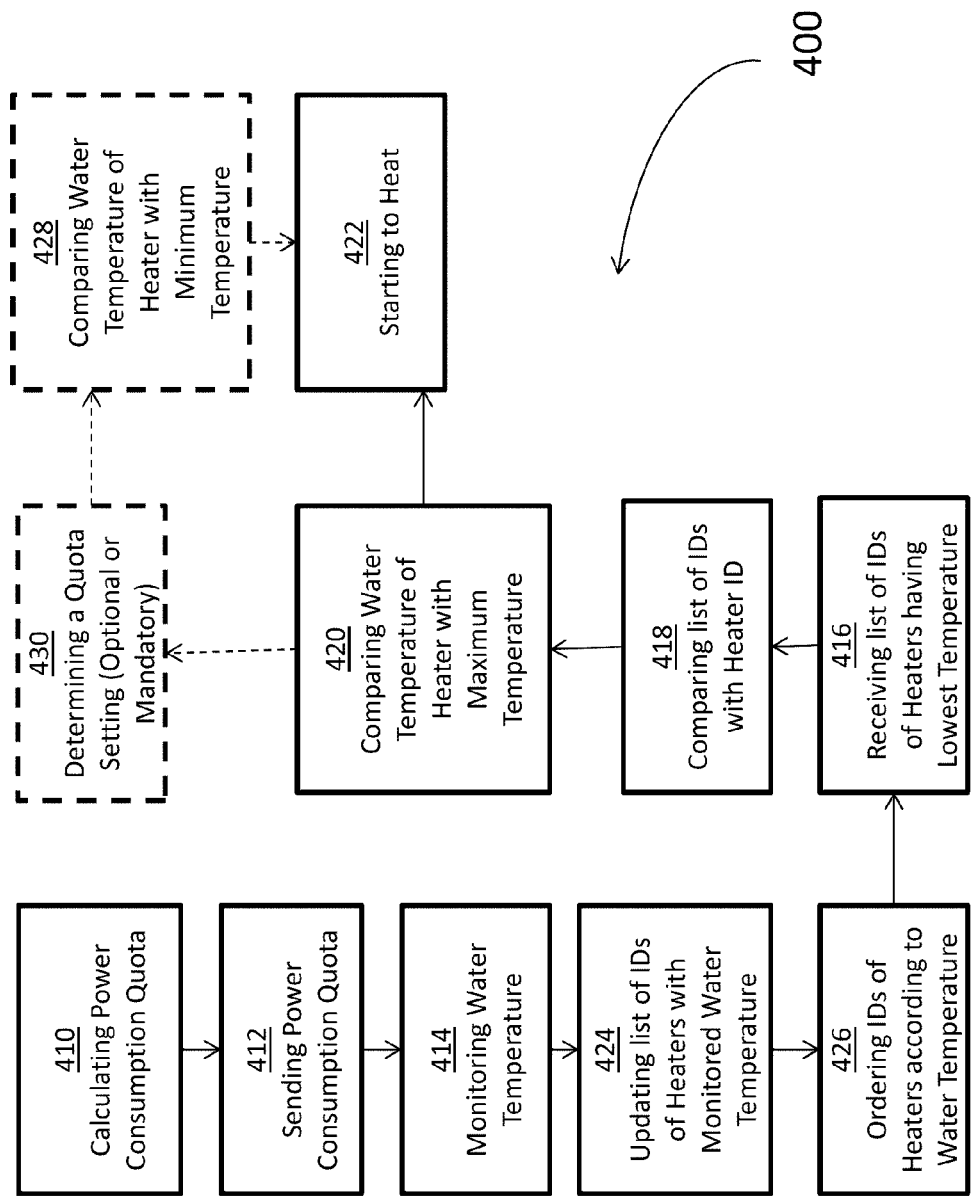
FIG. 5A is a flow chart of a load management method for controlling distributed community loads, according to one embodiment.

There is presented in FIG. 5A, a distributed algorithm 400 for load management. Shown in FIG. 1A, each water heater 106 is equipped with a networked controller 104 that is adapted to perform the distributed algorithm 400. The controller 104 allows the water heaters to communicate between each other; it can measure the hot water's temperature, and it controls the electrical consumption of the water heater.

Depending on load forecasting, potential of energy storage, state of the loads, the availability of generation, and/or market price, a power consumption quota 410 is determined. A time dependent quota that respects the conditions discussed further allows creating any load profile. The quota can be calculated inversely proportional to a variable tariff; high prices mean low quotas and low prices mean high quotas. The quota can be represented by power units. For example one unit is equal to 1 kW. In this case, if a water heater operates at 4.5 kW it needs 4.5 units to operate at full power. In the simulations, there is considered that one unit is equal to 4.5 kW; all water heaters are identical and have a single heating element of 4.5 kW. Therefore, the number of water heaters can express the quota. This simplifies the presentation. For example, if there are 10,000 water heaters with single heating element of 4.5 kW participating in the load management program, and the quota is 18 MW then only q=4000 water heaters are allowed to consume at the same time.

There are two types of quotas: optional and mandatory. In optional quota water heaters respect the quota until their hot water temperature reaches a minimum level Min. Then they will consume without respecting the quota as it is optional. In mandatory quota, water heaters respect the quota without considering the hot water temperature. This type of quota can be used when the security of the grid is more important than user's comfort. It can be used to avoid blackouts for example. To turn off all the water heaters, the electric utility can send them a mandatory quota fixed to zero q=0.

Once the quota is calculated, its value q is sent 412 via the network 102 to all the controllers 104. If the controllers are connected to a Smart Grid, this information can be available to the controllers via a Smart Meter.

Knowing the quota's value q, as each controller monitors 414 the water temperature of its associated water tank, the controller has real time information about the water temperature x(t). It receives 416, via the network 102, from the community of participating water heaters 106, a list of controller identification numbers (ID) ordered by temperature 426. Each controller receives 416 the temperature of only a set of q water heaters having the lowest temperature. If its own ID is present 418 in the ordered list and its hot water temperature is lower than the maximum value (Max) 420 then it starts heating 422. In other words, a given water heater decides to consume only what it needs to consume (its temperature is under Max) and it has a lower hot water temperature than at least (N-q) water heaters. If not, it will update 424 the information in the list and pass it on. Water heaters having the lowest temperature always have the priority to consume.

In a set $X_N(t)$ of N water heaters 106 participating in the load management program, there is a subset $X_q(t)$ of q water heaters 106 with the lowest temperature where $X_N(t)=X_q(t)\cup \overline{X}_q(t)$. Each element in the set is a couple (x(t),ID) of temperature x(t) and a unique controller identification number ID.

$$X_N(t)=\{(x(t),ID) \text{ of all water heaters}\} \quad (3)$$

The size N of $X_N$(t) may vary with time t when water heaters 106 leave and join the load management program. The size q of $X_q$(t) varies with time depending on q's value. It is considered that N and q are time invariant. Elements in $X_q$(t) have higher priority to use the energy because their temperature is lower than those of $\overline{X}_q$(t).

In one embodiment, each controller 104 monitors the water temperature 414 by calculating or measuring its own temperature every t minutes and communicates it to other water heaters 104 in the community. A decision is made every t minutes and only water heaters 106 with the lowest temperature will consume electricity. The total number of water heaters operating at the same time is based on the general power consumption quota. Waters heaters 106 that do not have a temperature within the range of temperature considered as being the lowest are turned off.

In another embodiment, when in optional quota setting 430, if a water heater's temperature reaches the minimum temperature comfort level (Min) 428, the water heater starts consumption independently of the quota. In this case, the quota may not be respected and a peak demand reappears, as we will see in the results section. A given controller i turns on the water heater only if the condition (4) is satisfied.

$$[(x_i(t)<\text{Max}) \wedge ((x_i(t),\text{ID}_i) \in X_q(t))] \vee [X_i(t)<\text{Min}] \quad (4)$$

In yet another embodiment, when in mandatory quota setting 430, the water heater must respect the quota independently of hot water temperature. In this case the quota is always respected. When the condition in (5) is respected, the controller i turns on the water heater, if not it turns it off.

$$[(x_i(t)<\text{Max}) \wedge ((x_i(t),\text{ID}_i) \in X_q(t))] \quad (5)$$

According to example of the present invention, each load (e.g. water heater) has a state parameter x(t) that represents its actual need for consumption. The state parameter, also called need parameter, is defined according to the type of the load; for example the state parameter of a water heater or an Electric Thermal Storage is the temperature, and the state parameter of a Plug in Electric Vehicle is the battery charge level. In these cases, low value of the state parameter corresponds to a higher consumption need. Hence, all the loads in the community can be ordered according to their state parameter.

A number of nodes q (i.e. loads) having the lowest state parameter values within the community N, constitutes a subset Q of the set N; the cardinality of Q is q(t) and its value varies with time according to the quota's value of the permitted power consumption.

Figure 5C:
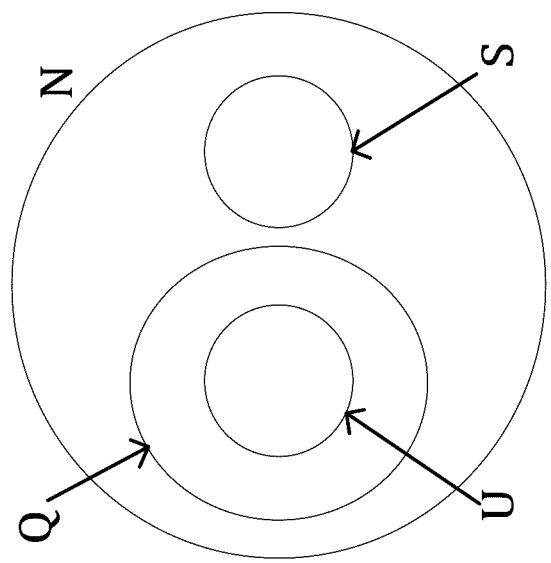
FIG. 5C is a diagram representing a set of saturated loads and a set of unsatisfied loads of a community, according to one embodiment.
Figure 5B:
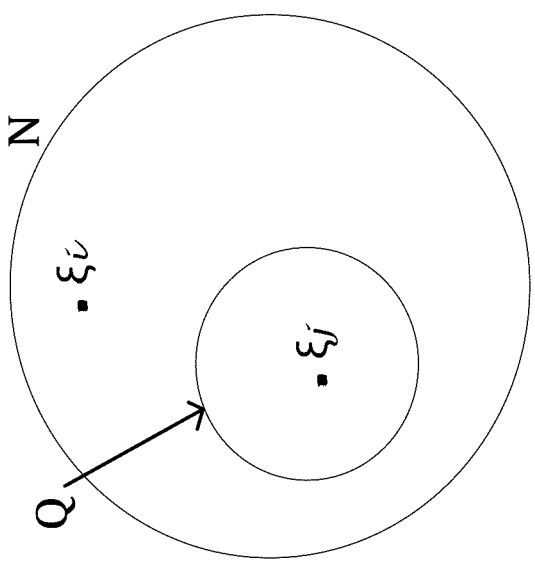
FIG. 5B is a diagram representing all the loads in a community, according to one embodiment.

The distributed algorithm in each node allows determining if a load belongs to the subset Q or not, as shown in FIG. 5B. A load belongs to the subset Q if its state parameter value is lesser than a threshold parameter value $x_{th}(t)$ and if the limited size q(t) of Q is respected. A threshold parameter value $x_{th}(t)$ is defined as follows: if $x_i(t)$ is the state parameter of node $\xi_i$ and $x_j(t)$ is the state parameter of node $\xi_j$ then $$\exists x_{th}(t): x_{th}(t) < x_i(t) \text{ and } x_{th}(t) > x_j(t)$$

$$\forall \xi_i \in Q^c \text{ and } \forall \xi_j \in Q \quad (6)$$

where $Q^c$ is the complement of Q in N.

The nodes in Q are the only nodes allowed to consume. By varying the value of q(t) with time, the consumption power profile is reshaped according to q(t). Knowing the quota's value, the nodes exchange information about their state parameter in order to build the subset Q, and to determine the threshold parameter value $x_{th}(t)$.

In one example, the control is regularly applied and not only during peak periods. The time is divided into cycles. The duration of a cycle can be set for example to 1, 5, 15 minutes or any other suitable period of time. A new decision for consumption is made by every node at the end of each cycle. The length of a cycle can be variable in time and in a cycle the following actions are performed: ordering, in ascending order, all the nodes of the set N according to the state parameter; calculating the value of the power consumption quota q according to load forecasting, storage capabilities, state of the loads, and generation availability with respect to the formulated conditions; receiving a quota value by all the nodes; constructing subset Q by using the first q values in the ordered list; determining the value of the threshold $x_{th}$ which is higher of the highest value in the subset Q and lower than the lowest value in $Q^c$; comparing by every node k, its state parameter $x_k$ to the threshold $x_{th}$ and to $x_{min}$; and deciding if electric consumption is required according to $x_{th}$, $X_{min}$, and the type of quota.

According to one embodiment an objective is to change the behaviour of the nodes of the community in a way that their power consumption profile meets the quota's values at all time. In one example:

$$\sum_{k=1}^{q} p_k(t) = \text{quota} \quad (7)$$

and $$\sum_{k=q+1}^{n} p_k(t) = 0$$

where the loads are in ascending order according to the state parameter, $p_k(t)$ is the power consumption of load k at time t, q=|Q|, and n=|N| hence, $$\forall \xi_j \in Q, p_j(t) \neq 0 \text{ and } \forall \xi_i \in Q^c, p_i(t) = 0. \quad (8)$$

There is a relation between the quota, which is the amount of power consumption permitted, and q the cardinality of Q. If all the loads are identical (i.e. they have the same power rating r), the quota's values becomes proportional to q(t), the time dependent cardinality of Q. Consequently, the objective equation is:

$$\Sigma_{k=1}^{n} p_k(t) \leq rq(t) \quad (9)$$

Therefore, varying the quota's value reshapes the load profile of the community N by allowing the loads with a higher need to consume first. Consequently, any power consumption profile can be created, if the variable quota respects certain conditions.

Conditions to be Respected

If, at time t, the quota's value q(t) is higher than the power that can be consumed by all the loads, the subset Q will have loads incapable of consuming power (i.e. $\xi_j \in Q$ and $p_j(t)=0$) and the objective equation is not respected. To avoid this situation the quota's value must be determined according to a first condition (i.e. condition 1):

$$q(t) < n(t) - s(t) \quad (10)$$

where s(t) is the cardinality of a set S of all the saturated loads within the community.

Note a saturated load is defined as a load having a state parameter value that is higher or equal to a maximum value (i.e. $x_k \leq x_{max}$). The maximum value (i.e. $x_{max}$) is determined according to the storage capacity of the load.

However, if the quota's value is lower than the power needed by the unsatisfied loads, some unsatisfied loads will overflow the subset Q; if the quota is mandatory, the comfort level of the users having their loads situated outside Q will be affected; if the quota is optional these unsatisfied node will consume without respecting the quota (i.e. $\xi_i \in Q^c$ and $p_i(t) \neq 0$) and the objective equation will not be respected. To avoid this situation with an optional quota the quota's value must be determined according to a second condition:

$$q(t) > u(t) \quad (11)$$

where u(t) is the cardinality of a set U of all the unsatisfied loads within the community.

Note, an unsatisfied load is defined as a load having a state parameter value less than a minimum value i.e. $x_k < x_{min}$. The minimum value (i.e. $x_{min}$) is determined according to the user's comfort level.

As presented in FIG. 5C, the satisfaction of the first and second conditions implies that:

$$U \cap Q^c = \emptyset \text{ and } S \cap Q = \emptyset \quad (12)$$

Having more storage capabilities reduces the limitation of the first condition, and using a mandatory quota overrides the second condition but it may affect user's comfort.

If the quota is constant over a period of time, a flat profile can be created when the quota is met at all time. When user's comfort is prioritized, the following assumption can be made: "the minimum energy needed by a load over a period of time after control must remain the same as before control".

This assumption sets a lower limit for a constant quota's value used to flatten a profile over a period of time T=24. Hence, a third condition is be formulated:

$$q(t) \geq \frac{\sum_{h=1}^{T} \sum_{k=1}^{n} p_k(h)}{T} \quad (13)$$

where $p_k(h)$ is the power consumption of load k during the period of time h, h=1 ... T.

Hence, the best possible theoretical result is achieved when an optional fixed quota is respected and equal to:

$$q(t) = \frac{\sum_{h=1}^{T} \sum_{k=1}^{n} p_k(h)}{T}. \quad (14)$$

Consequently, the energy needed over a period of time T does not change, the user's comfort is not affected, and the overall load is flattened. The value of the quota is equal to the average power consumption during the period of time T. In the following case study, a constant quota equal to the average power over 24 hours is to be met by a community of loads.

According to the distributed algorithm based on the threshold value described above, the power consumption of the water heater is driven by its parameters as follow:

$$p_k(t) > 0 \text{ if } [b_k(t) = 1 \text{ and } m_k(t) = 1]. \quad (15)$$

The value of m(t) varies according to the following:

$$m_k(t+1) = \begin{cases} 0 & \text{if } x_k(t) > x_{max} \\ 1 & \text{elsewhere} \end{cases}. \quad (16)$$

When the quota is mandatory, the value of b(t) varies according to the following:

$$b_k(t+1) = \begin{cases} 1 & \text{if } x_k(t) < x_{th}(t) \\ 0 & \text{elsewhere} \end{cases}. \quad (17)$$

When the quota is optional, the value of b(t) varies according to the following:

$$b_k(t+1) = \begin{cases} 1 & \text{if } x_k(t) < x_{th}(t) \text{ or } x_k(t) < x_{min} \\ 0 & \text{elsewhere} \end{cases}. \quad (18)$$

In one embodiment, in order to determine $x_{th}(t)$, a histogram of temperature is constructed by all the nodes. The values under $x_{min}(t)$ are the unsatisfied nodes, and the values over $x_{max}(t)$ represents the saturated nodes. The threshold value $x_{th}(t)$ is determined using the information in the histogram and the quota's value. The use of a histogram minimizes the size of the messages exchanged between the nodes because there is no need to exchange a list of pair (x(t),ID) but only a table of temperature distribution.

Results without any Control

Figure 6:
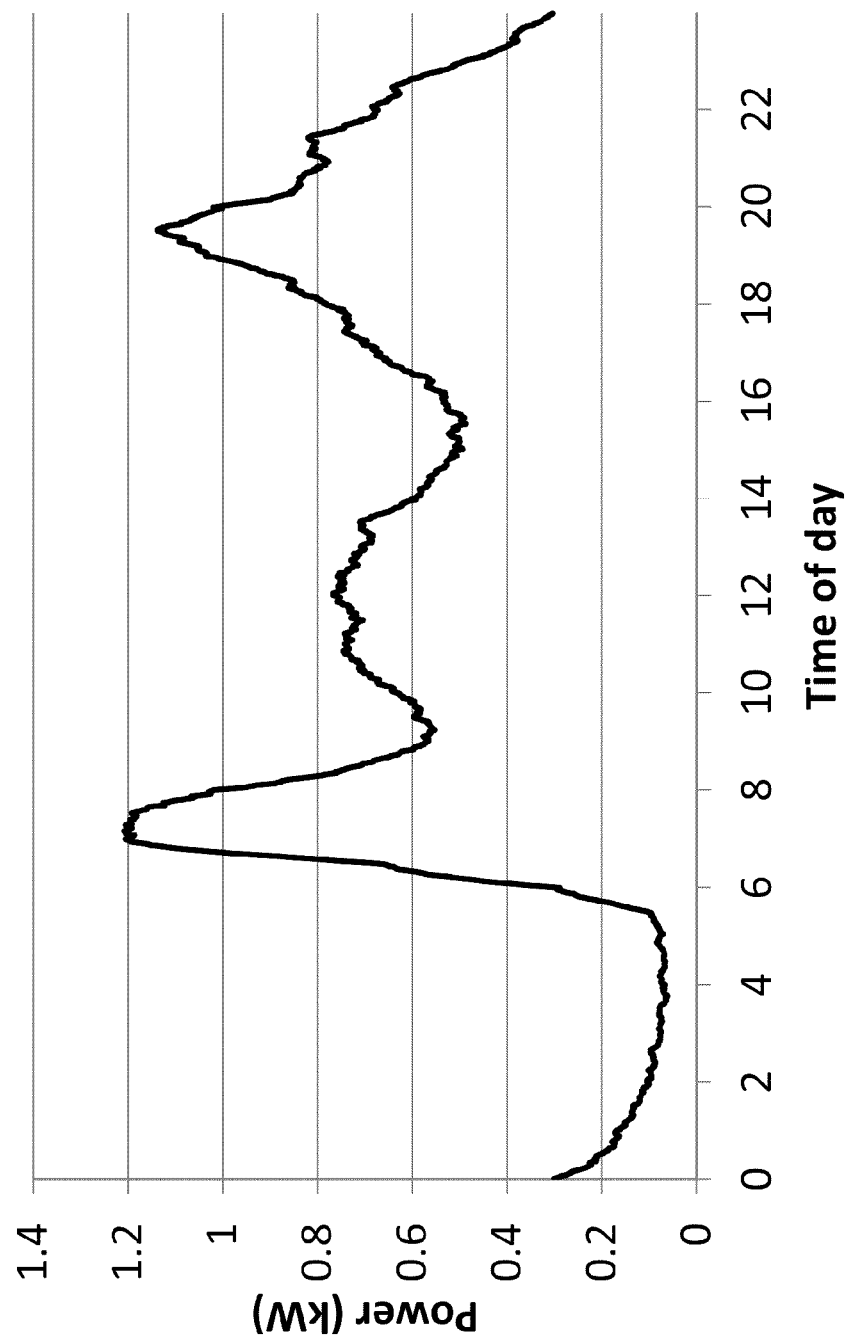
FIG. 6 is a graph representing a normalized average daily power consumption profile, according to one embodiment.

Presented in FIG. 6 is a graph showing the average power needed by a water heater over 24 hours (based on a simulation of 10,000 water heaters). This profile is comparable to the typical power consumption profile. During the night between 1 AM and 6 AM the energy consumption dropped below 0.5 kW. During the day and evening consumption varied between 0.5 kW and 1.2 kW. There were two higher peaks at 7 AM and 7 PM. Around noon and mid-evening the level of consumption was lower than the peaks but it lasted for a longer period. The normalized energy consumption during 24 hours is around 14 kWh per day.

Results with Load Management Distributed Algorithm

Figure 7:
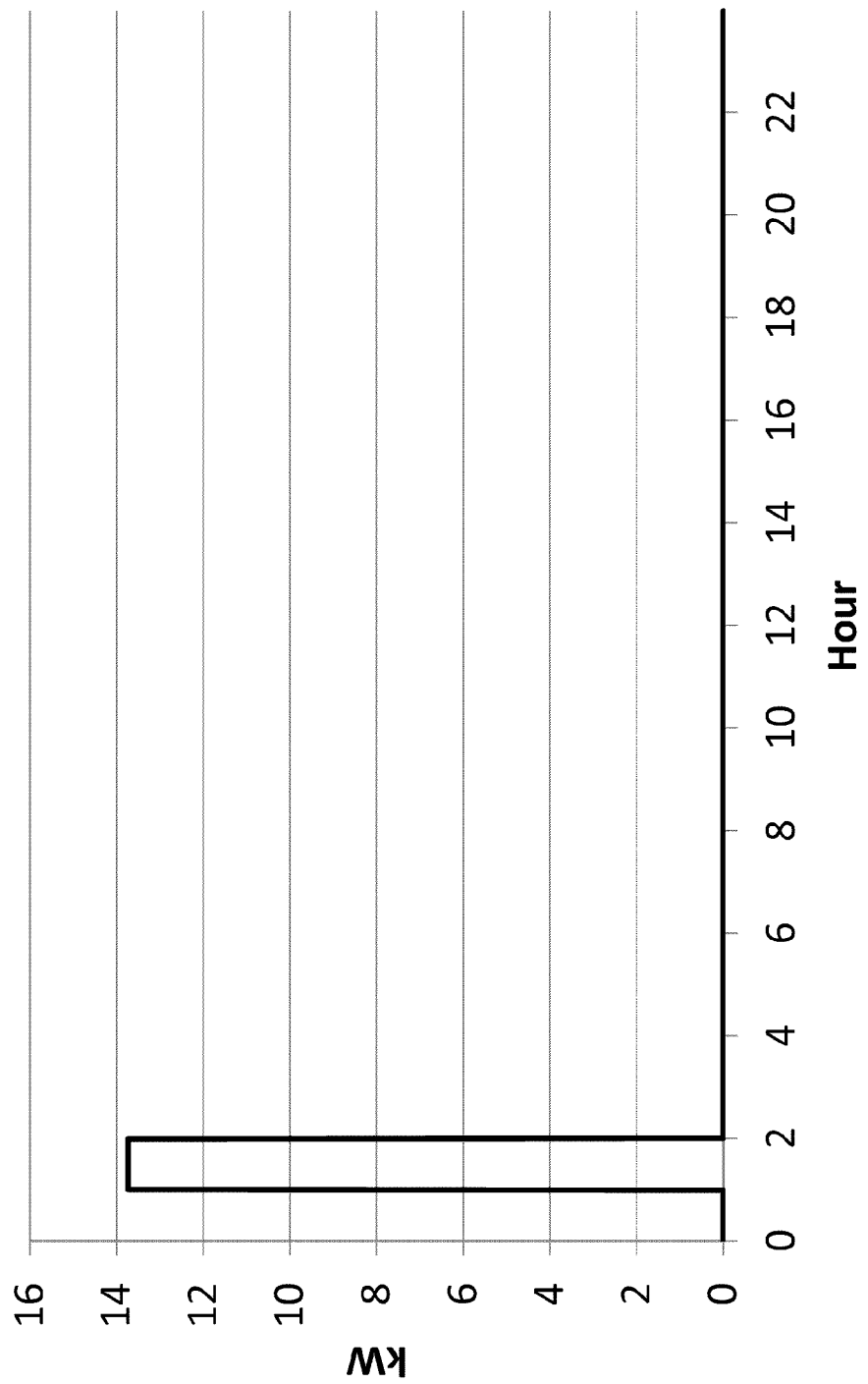
FIG. 7 is a graph representing a worst case power consumption profile, according to one embodiment.

One objective is to have a relatively more uniform power distribution of the Domestic Hot Water load profile. The peak reduction depends on the shape of the curve. In one power consumption profile, a power consumption is uniformly distributed over 24 hours. In such a profile, there is no peak to reduce and there is no need for control. In an alternate power consumption profile, a power consumption is concentrated in only one unit of time, as shown in FIG. 7. Although non realistic, the reduction percentage of this peak is relatively greater and it is harder to control for changing the profile to a uniform shape.

Figure 8:
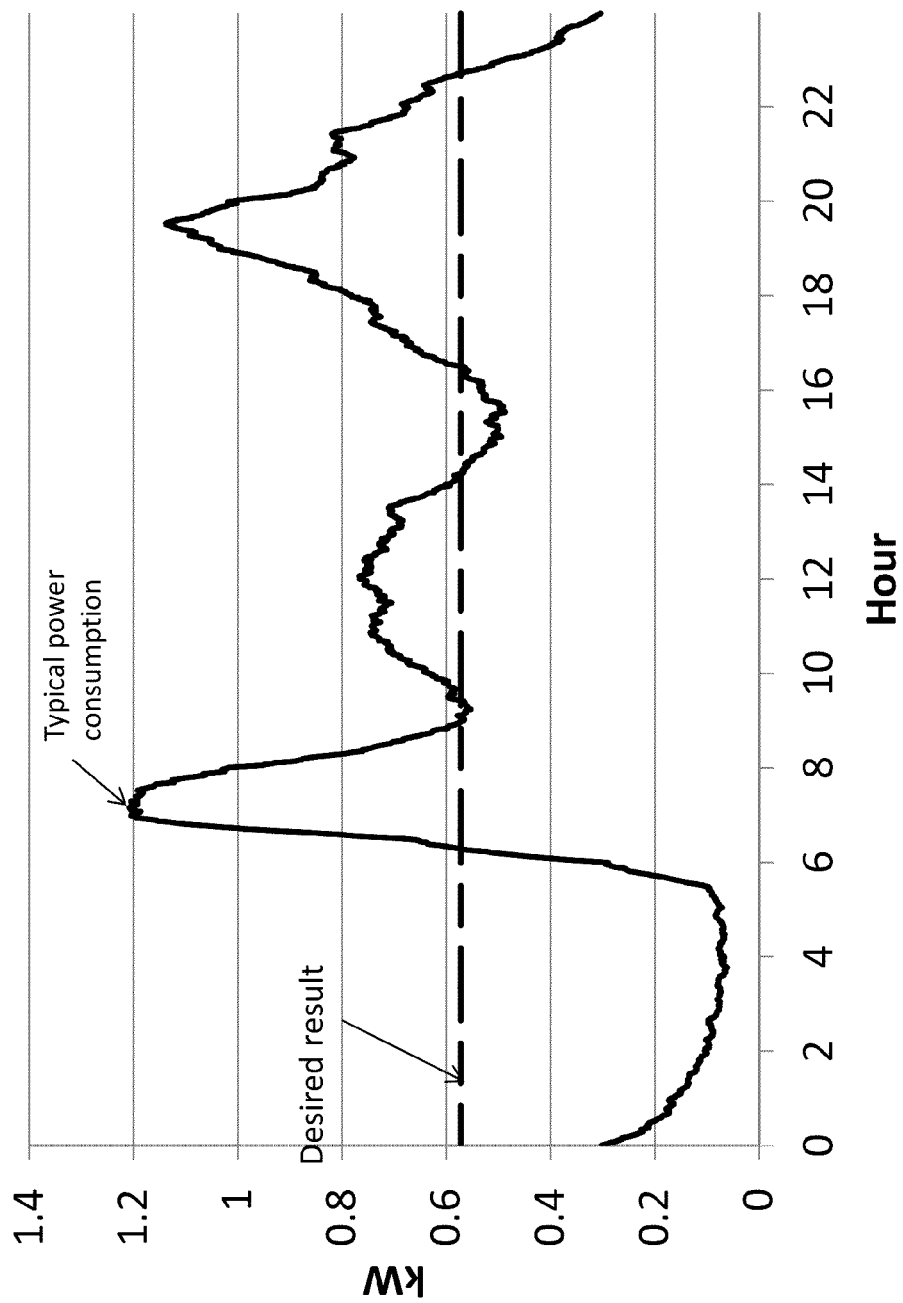
FIG. 8 is a graph representing a best possible result for the typical consumption profile, according to one embodiment.

To a more realistic profile obtained from a simulation based on typical hot water usage in a number of dwellings, there is applied a probabilistic mathematical model as described in the previous section. The objective is to transform this profile to a uniform profile as shown in the graph of FIG. 8.

Figure 9:
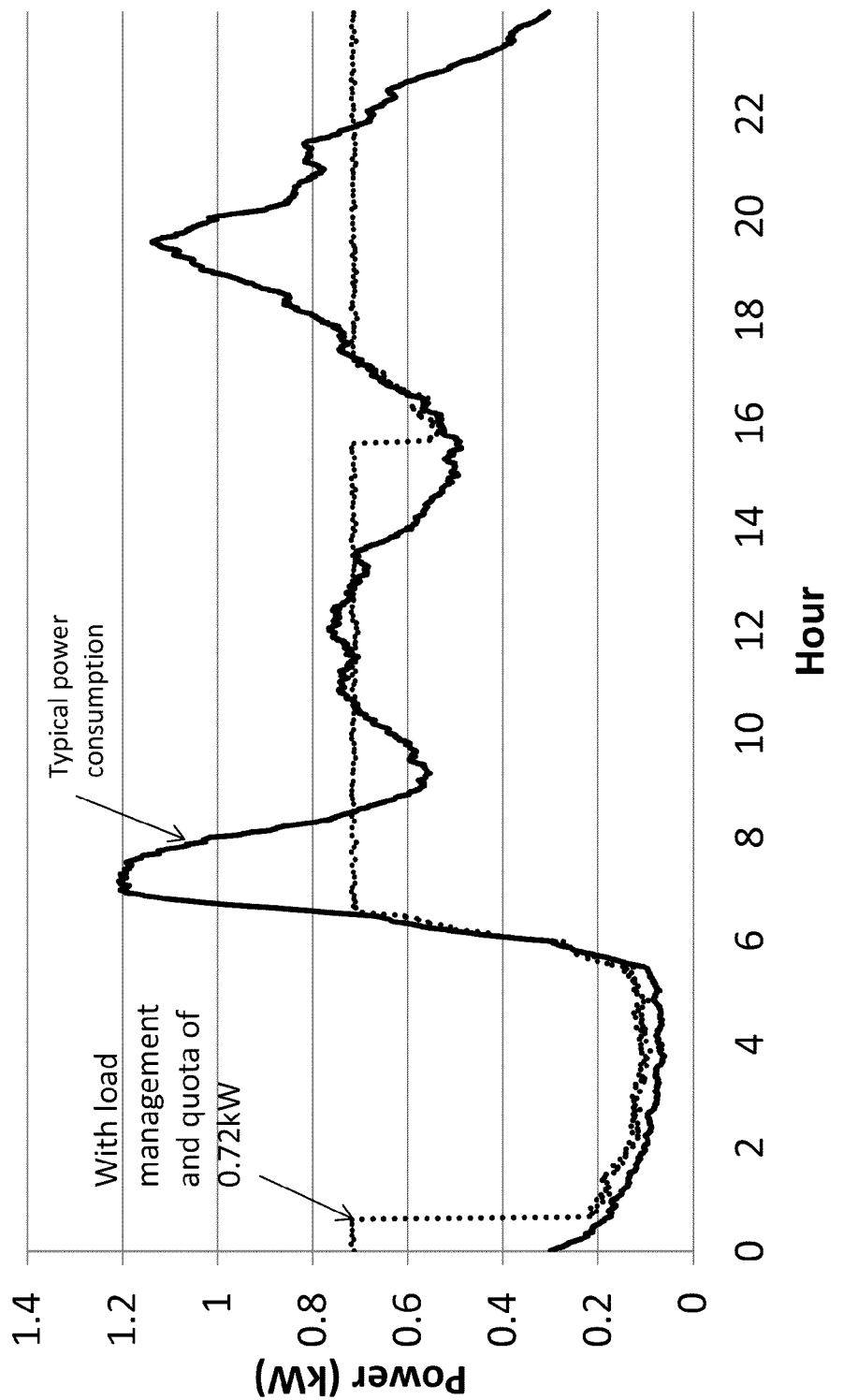
FIG. 9 is a graph representing a power consumption profile where a load management method was applied with a normalized quota of 0.72 kW, according to one embodiment.

According to one embodiment, when there was applied the distributed algorithm with a normalized quota q=0.7 kW to the realistic profile, it was possible to reduce the peak by 40% from 1.2 kW to 0.7 kW, as shown in FIG. 9.

In a perfectly uniform daily profile the value of the power is constant during 24 hours. Considering that this value corresponds to the mean value of the realistic profile presented earlier equal to 0.6 kW, if there are applied constant quotas with values lower than 0.6 kW those will not be respected. Since, with an optional quota, it is not possible to force the users to consume less than the energy needed during 24 hours, the value of the quota must be higher than the expected mean value of a random profile.

Figure 10:
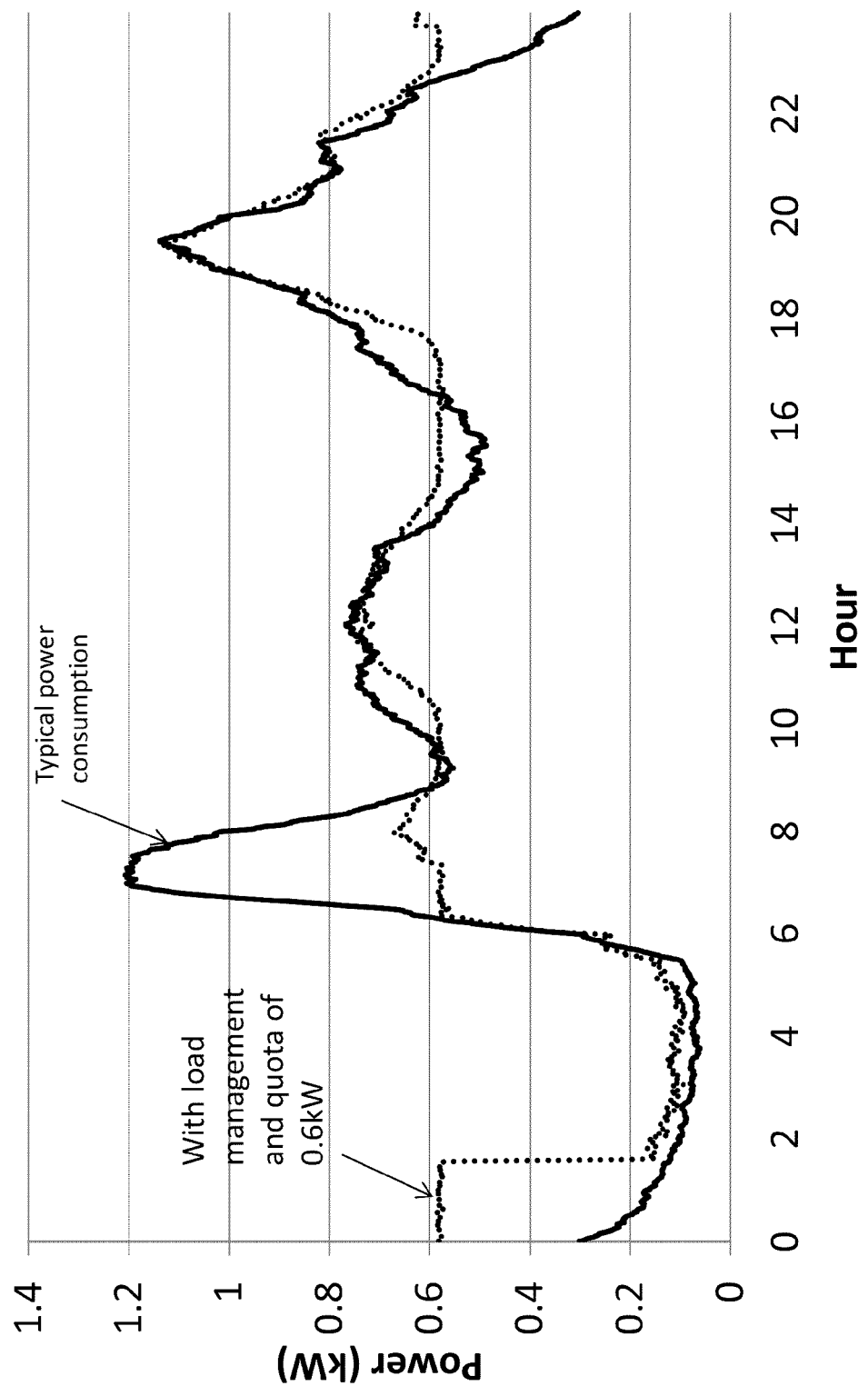
FIG. 10 is a graph representing a power consumption profile where a load management method was applied with a normalized quota of 0.6 kW, according to one embodiment.

When the aim was to reduce the highest peak of the morning by 0.6 kW, the optional quota wasn't respected and the reduction wasn't fully reached. In FIG. 10, there can be seen a reduction of the peak of the morning by 0.55 kW but the peak of the evening is the same as the peak of the original profile. The quota was respected until 7 o'clock where another peak, lower than the original, reappeared and after that the shape of the controlled profile followed the original shape. The value of this quota is too low. It doesn't permits to reduce all the peaks while respecting the comfort of the user.

Figure 11:
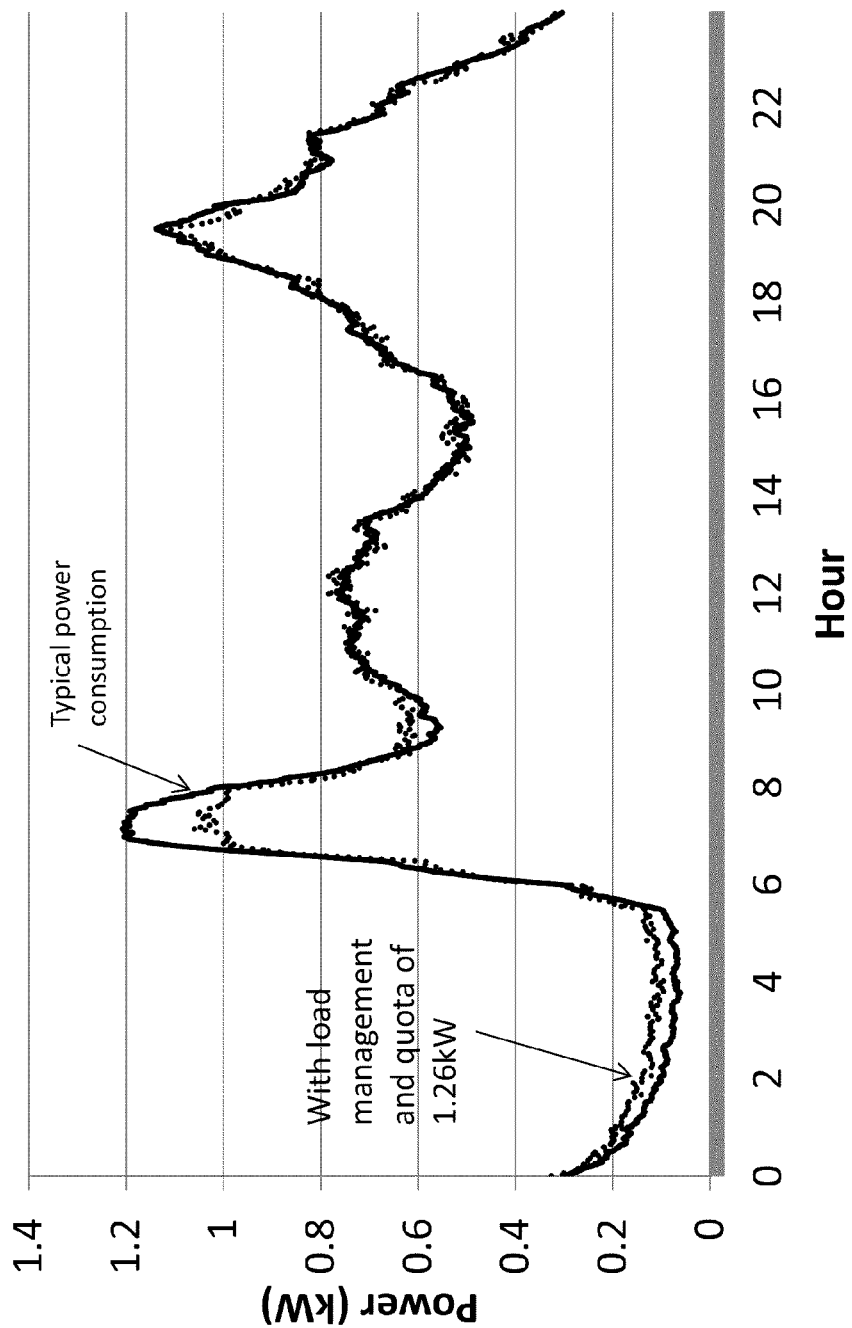
FIG. 11 is a graph representing a power consumption profile where a load management method was applied with a normalized quota of 1.26 kW, according to one embodiment.

When there was applied the distributed algorithm with an optional quota of 0.72 and higher, the quota was always respected. But the benefit decreased with increasing the value of the quota. In FIG. 11 for example, the quota is equal to 1.26 kW.

This quota is respected during the 24 hours. The peak is 1.11, but there can be seen that the shape of the curve is almost the same as the original one. Therefore it is noticed that there is no benefit for high quotas.

Figure 12:
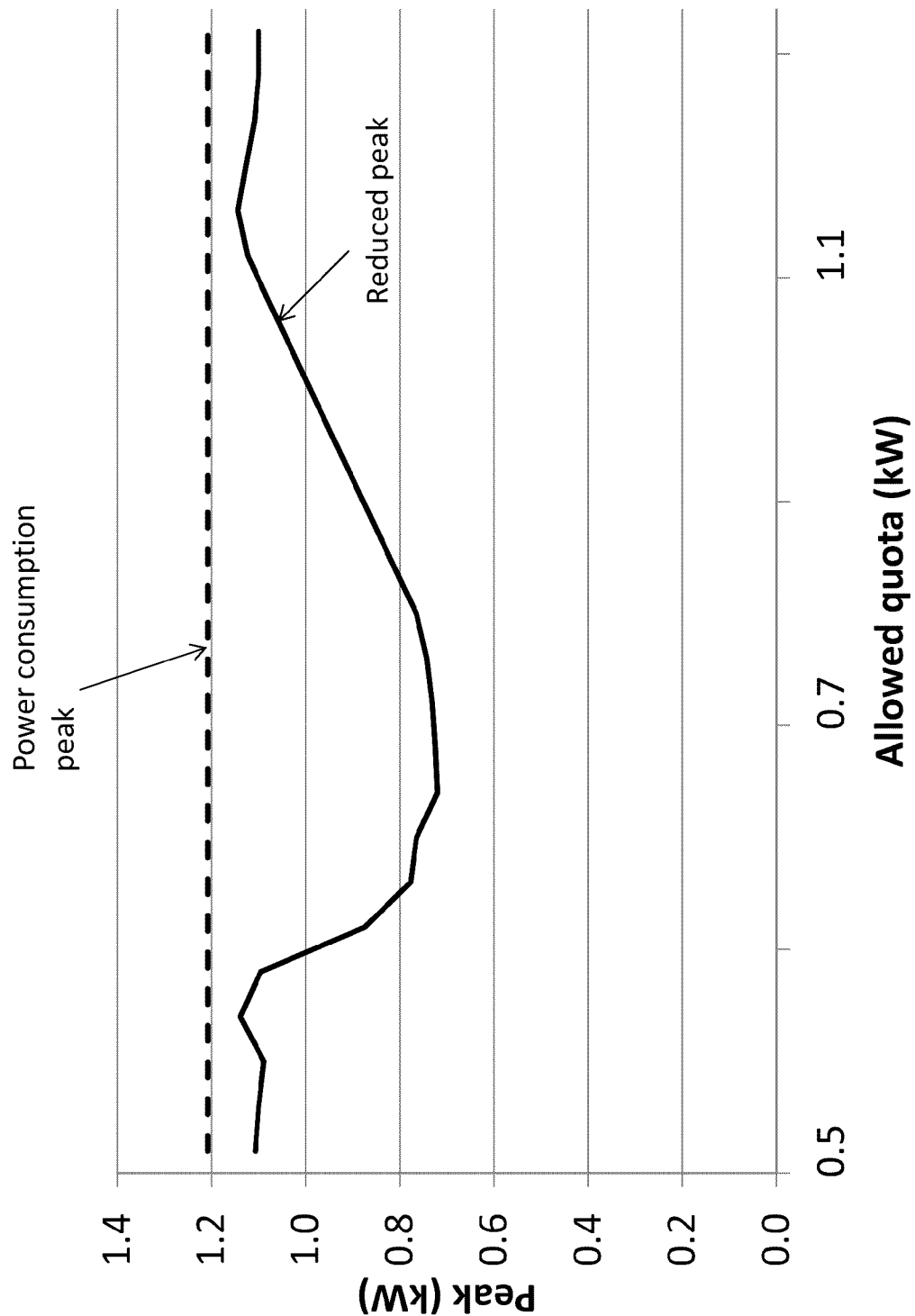
FIG. 12 is a graph representing the reached consumption peak in function of allowed quota, according to one embodiment.

Several simulations were done with different values of quota. In FIG. 12 there is shown the reached peak in function of allowed quota which is the aimed peak. The aimed quotas are reached only when the quota passes a certain value 0.7 kW in this case.

This confirms that the quota is only effective in reducing the peak when its value is within a certain range. If the quota is too low, it doesn't reduce the peak. This is because the algorithm, in order to respect user comfort, ignores the optional quota allowing any water heater to start consumption as soon as its temperature drops to the minimum level (Min=60° C.). At the higher quota levels, the peak is nearly the same and therefore there is no benefit.

Electric Energy Stored in a Thermal Form in Water Heater

To store the electric energy in thermal energy form the temperature was allowed to drop to a minimum value of 55° C. instead of 60° C., and the temperature was allowed to increase to a maximum value of 70° C. instead of 65° C.

Figure 13:
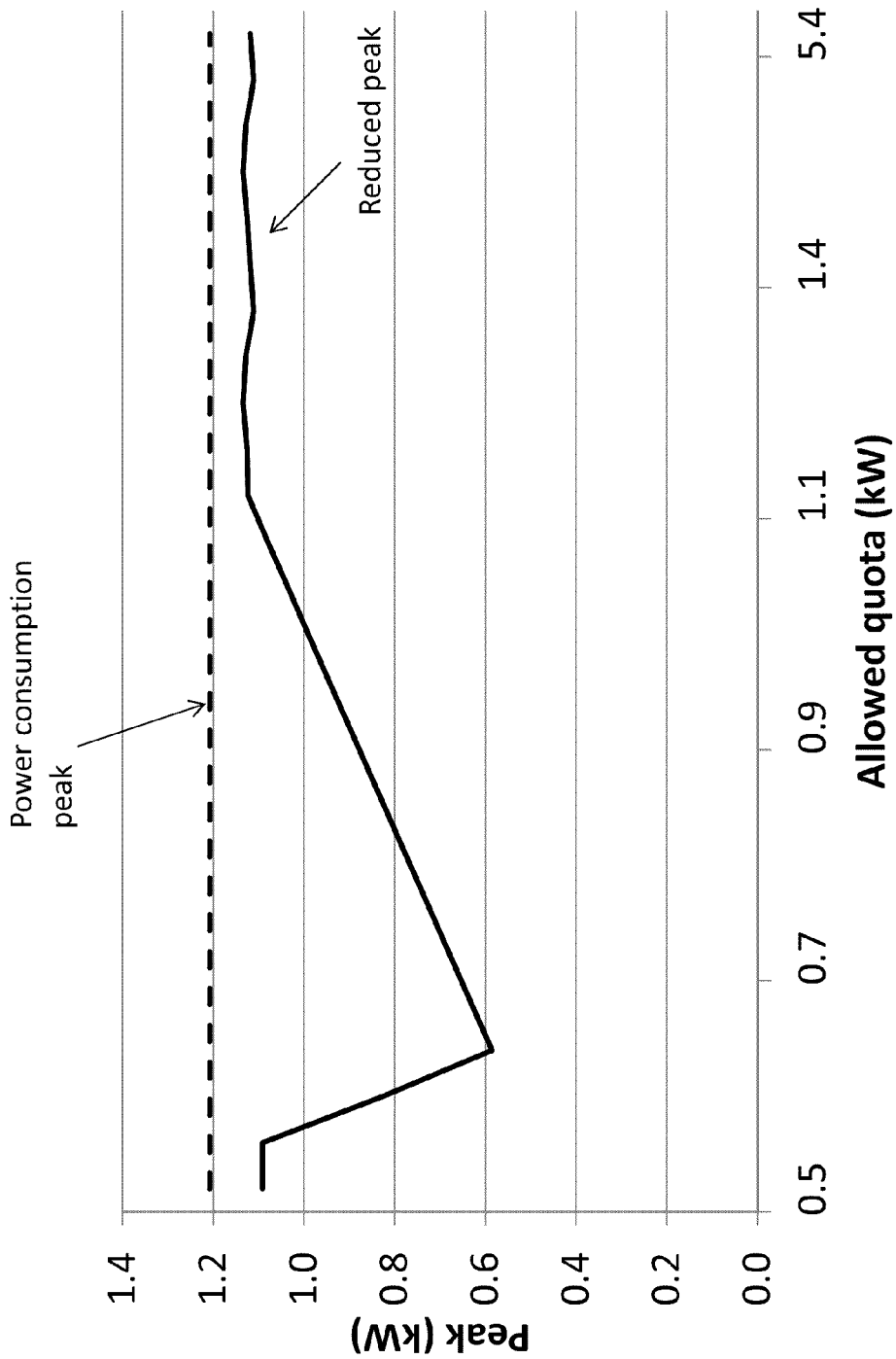
FIG. 13 is a graph presenting the effects of various quota values on various peak consumption values, according to one embodiment.
Figure 14:
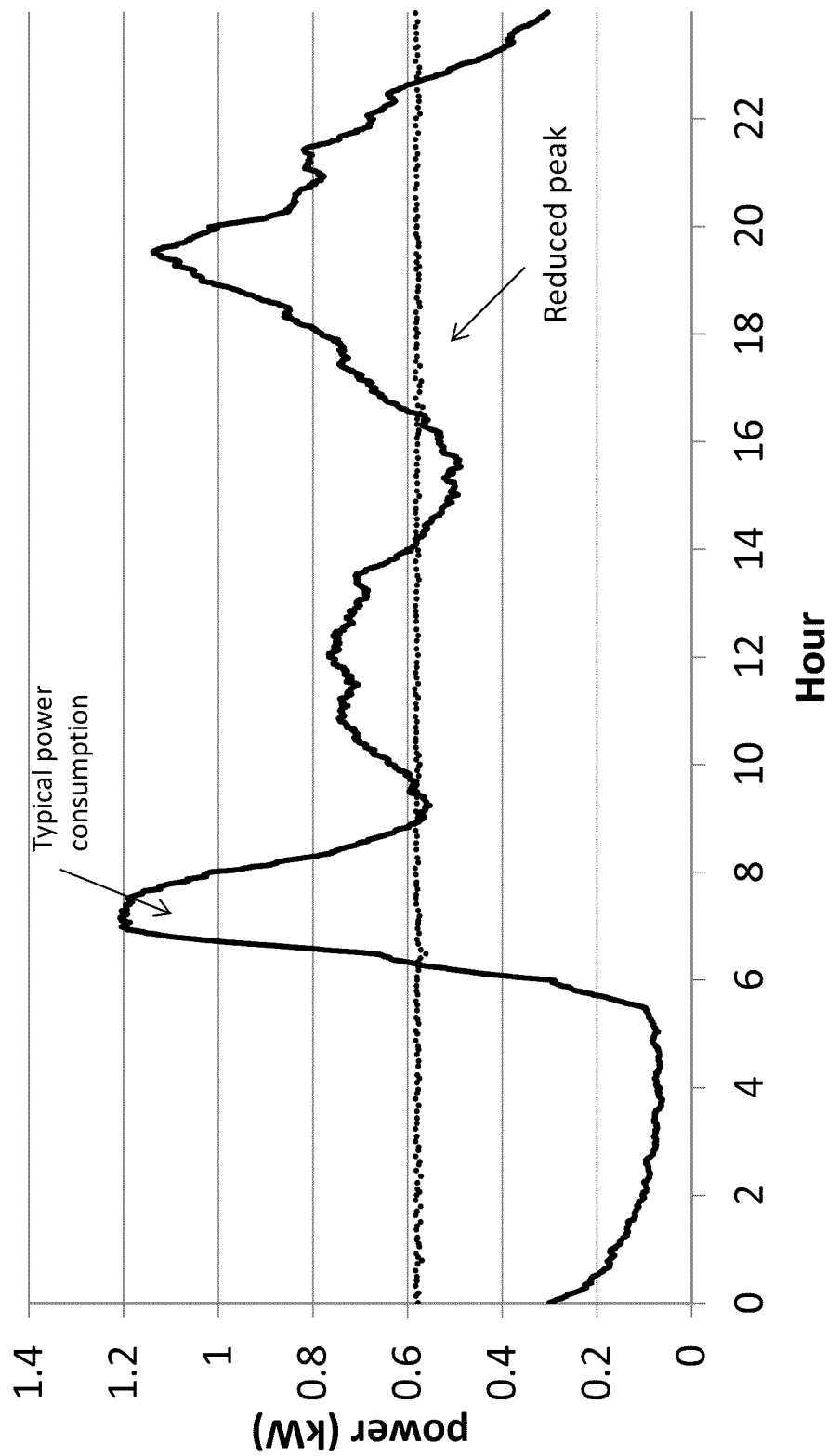
FIG. 14 is a graph presenting a 50% consumption peak reduction, according to one embodiment.

Several simulations were done with different values of quota, as shown in FIG. 13. Again, the quota was only effective in reducing the peak when the quota's value was within a certain range. But, it was possible to reduce the peak from 1.2 kW to 0.6 kW. This is the best possible result that can be achieved for this profile, as shown in FIG. 14. This corresponds to a peak reduction of 50% and a load factor of 100%.

This result is specific for this profile. Considering the worst case profile described earlier, the best possible result may not be achieved unless the difference between Max and Min (Max−Min), becomes unrealistically high.

When the value of the quota is too low or too high, there is no benefit. When the optional quota is too low compared to the consumption need, the controllers don't respect it because it gives priority to the user comfort. When the quota is too high it means that the reduction aimed is low therefore the benefit is low.

Discussion

In practice, maintaining hot water at a higher temperature may require the use of a Thermostatic Mixing Valve (TMV) to ensure constant and safe outlet temperatures. Different material for the water heater tank must be considered as well because the durability of the tank depends on the water temperature among other factors.

When hot water is maintained at a higher temperature, hot water consumption is reduced because the consumer will use a lesser quantity of hot water mixed with a greater quantity of cold water. The water heater model used in our simulations considers a constant amount of hot water extraction. We believe that using a variable amount of hot water extraction depending on the high temperature will improve our results on reducing the peak demand.

Another factor that may improve our results is when the quota is variable with time. The quota must indicate the load on the grid. When the load is higher the quota is lower and when the load is low the quota must be higher. Our results were simulated with a constant quota; the quota is fixed during the simulation of 48 hours. When the quota is higher during off-peak time more energy will be stored in hot water because a higher number of water heaters will be allowed to raise their temperature to the Max (70° c.). There is believed that a variable quota improves the results.

Despite all these simplifications, a reduction of 50% is a very encouraging result. Considering that 2,400,000 electric water heaters are responsible of 5% of a grid peak of 36,000 MW and a community of 1,600,000 water heaters participates in a load management program and 50% of their peak is reduced, then a reduction of 600 MW can be reached.

A skilled reader will understand that if load management at the appliance level were applied, it would be possible to achieve a better theoretical profile, for the case of water heaters, using thermal energy storage and quota of consumption power.

According to one embodiment, there is a distributed load management method applied to water heaters. Water heaters communicate together and with the electric utility to have the information necessary for the distributed algorithm. This distributed algorithm reduces the peak by about 40%. By increasing the hot water's temperature to 70° C. during off-peak time and allowing it to drop to 55° C. during peak-time, results are improved by additional 10%.

A skilled reader will understand that efficiency of a collaborative method is increased when the right quota is chosen. When the quota is too low another peak reappears.

Overlay Network Topology

In the present there is described an overlay network topology system, architecture and protocols. The system is a communication network that allows distributed devices, herein referred as nodes, to build and manage a community of devices in order to exchange messages or information of small and medium size. Further described in the present is how to construct and manage a community of nodes within the system. The primitives or commands necessary in order to use the system are also described.

A community of nodes could be any group of nodes adapted to communicate with each other. The group of nodes share a common need or interest.

According to one embodiment, each node of the group is a device such as a sensor or a controller for a heating unit, a hot-water heater, an electrical car, an electrical entrance of a building or any other type of unit or combination of units that require electrical energy to operate. In these examples, each device has a common need for electricity; however it is possible in other examples that the common need be different. For instance, in another example, each device has a common need for water.

According to one embodiment, the group of nodes share a common need and have a common objective. For instance, when the common need is electricity, the common objective could be to reduce the global electricity consumption of all participating devices. When the common need is water, the common objective could be to reduce the global water consumption of all participating devices.

According to one embodiment, the common objective is achieved by distributing the commonly needed resource according to each device requirements. As the devices are adapted to communicate with each other, the requirements of each is known and the resource can be effectively distributed.

In yet another embodiment, each node of the group is a device for distributing information data such as a computer terminal or a surveillance system. Each device shares a common interest such as sharing or exchanging multimedia content, participating in an online computer game, detection and identification of moving objects, etc.

According to one embodiment, the number of nodes in a community is variable and the system is adapted to dynamically handle system size variations while assuring an acceptable level of fault tolerance.

Prior Art Tree Topology

Figure 15B:
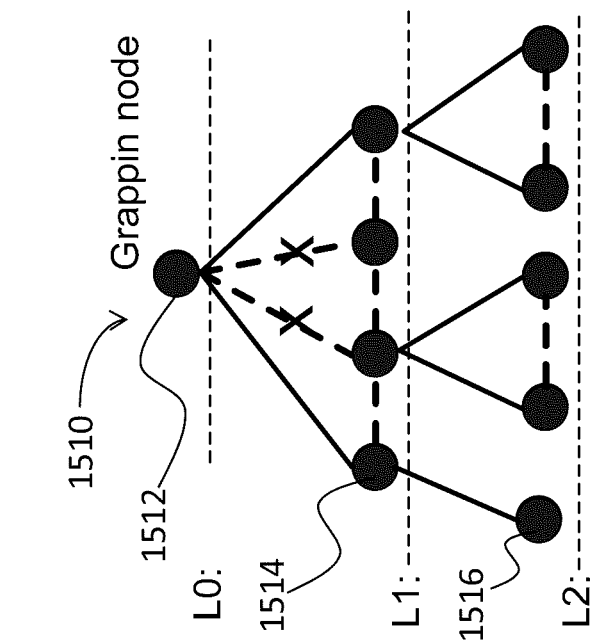
FIG. 15B is a prior art representation of a linked tree topology.
Figure 15A:
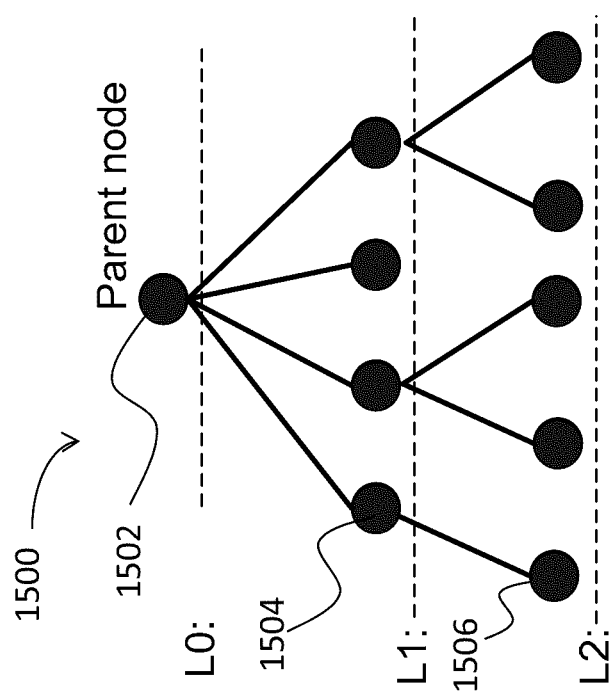
FIG. 15A is a prior art representation of a tree topology.

There is presented in FIGS. 15A and 15B prior art network topologies such as a tree topology 1500 in FIG. 15A and a linked node tree topology in FIG. 15B. In a tree topology 1500 there is one root node 1502 and n direct children 1504 and each of the n direct children has n children 1506, etc. In a linked node tree topology 1510 there is a root node 1512 and n direct children 1514 that are sequentially linked, each of the n direct children has n children 1516 that are also sequentially linked, etc.

Ring-Tree Topology

In a ring-tree topology, there are n root nodes forming a root ring. Each root node is adapted to have n direct children forming a ring with this root node and each direct child is adapted to have n children forming another ring, etc.

Presented in FIG. 16, according to one embodiment, is a ring-tree topology 1600 of two levels, a first level 1602 referred here as L0 and a second level 1604 referred here as L1. Each ring has a Super node or herein forth referred to as a parent node 1606. The ring-tree topology 1600 can be seen as a tree topology where nodes of the same parent form a ring between each other and with their parent (i.e. the parent node links the ring with the rest of the network or community). Each parent in the tree topology has n nodes situated on one level. Associated to each parent node of the Ring-Tree topology is n−1 children nodes 1608 situated on each level until L−1 levels. In other words, in a tree topology a parent situated on level 1 can have n children situated on level 2; in a Ring-Tree topology, a parent node of level 1 can have n−1 children of level 2 and another n−1 children of level 3, etc. until the level p−1.

According to one embodiment, the value of n may differ according to the p level in the ring-tree topology. For example the value of n may be greater for a lower p level to increase the robustness of the topology.

According to one embodiment, there is associated to each node (1606 and 1608) a neighbouring table that has a list of node identifiers representing each neighbouring node.

According to one embodiment, a parent node 1606 of level L1 1604 holds information about all nodes of the same ring and all its descendants only. It doesn't hold information about the descendants of its neighbour. Its neighbourhood table is limited to a size p×n. The total number of nodes in the community is $N=n^p$ nodes, $M=(n-1) \cdot n^{(p-1)}$ of them are leaf nodes and $G=n^{(p-1)}$ are Parent nodes. The proportion of Parent nodes is 1/n. Recall that n is the number of participants in a ring and p is the number of level in the community.

Each ring, via its parent node, can be seen as a node by other parent nodes on the same level. If for example a parent node needs to send a message to its neighbour it can specify if the message must reach only the neighbour or the neighbour and its entire descendant (Multicast Message). So a Parent node can be addressed as a single node or as a group of nodes composed by the Parent node and its entire descendants. Descendants of the neighbour are not visible to a given node (i.e. nodes do not hold information about descendants of the neighbor). So a given node deals with a limited number of participants but it can still reach the whole community.

According to one embodiment, a parent node has more roles or responsibilities than has a child node. As a parent node has a greater number of node links than has a child node, the parent is responsible for routing information to a greater number of nodes. Moreover, the parent node is responsible for assuring a link between the children nodes and the nodes of a lower level.

When a node exists on level L where L<(p−1), this node is a Parent node; because all nodes are Parent nodes except the child nodes (i.e. nodes of level p−1).

Figure 17:
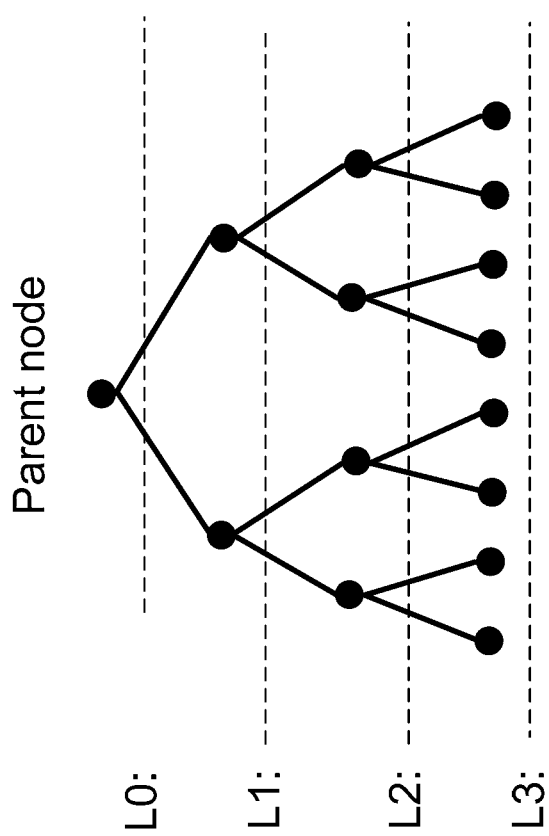
FIG. 17 is a prior art representation of a four level tree topology having 15 nodes.

Presented in FIG. 17 is a prior art four level tree topology having 15 nodes. In a tree topology the number of links between the nodes is limited to a single link. When the single link disappears, the corresponding node gets disconnection from the network. It is known that the tree topology presents a relatively high vulnerability to node disconnections.

Figure 18:
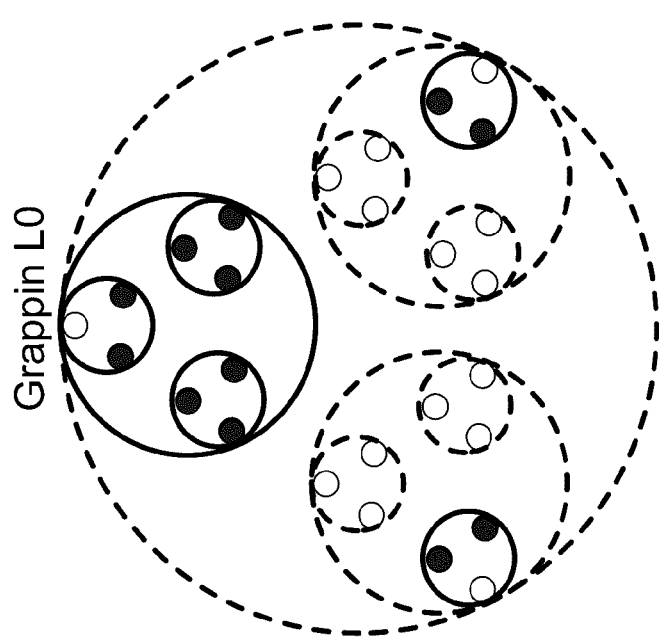
FIG. 18 is a representation of a three level ring-tree topology adapted to have up to 27 nodes, according to one embodiment.

Presented in FIG. 18 is a three level ring-tree topology adapted to have up to 27 nodes, according to one embodiment. With such topology a node can have a maximum of n*p direct bidirectional links with its neighbours.

Returning to FIG. 16, according to one embodiment, one of the nodes of the topology 1600 is an assignment server 1610. The assignment server 1610 is adapted to assign a position to a new comer node as further described below.

According to an alternate embodiment, the assignment server 1610 is a device that is not part of the topology 1600. The assignment server 1610 is adapted to communicate with at least some of the nodes of the topology 1600 and assign a position to a new comer node as further described below.

OSI Model

Figure 19:
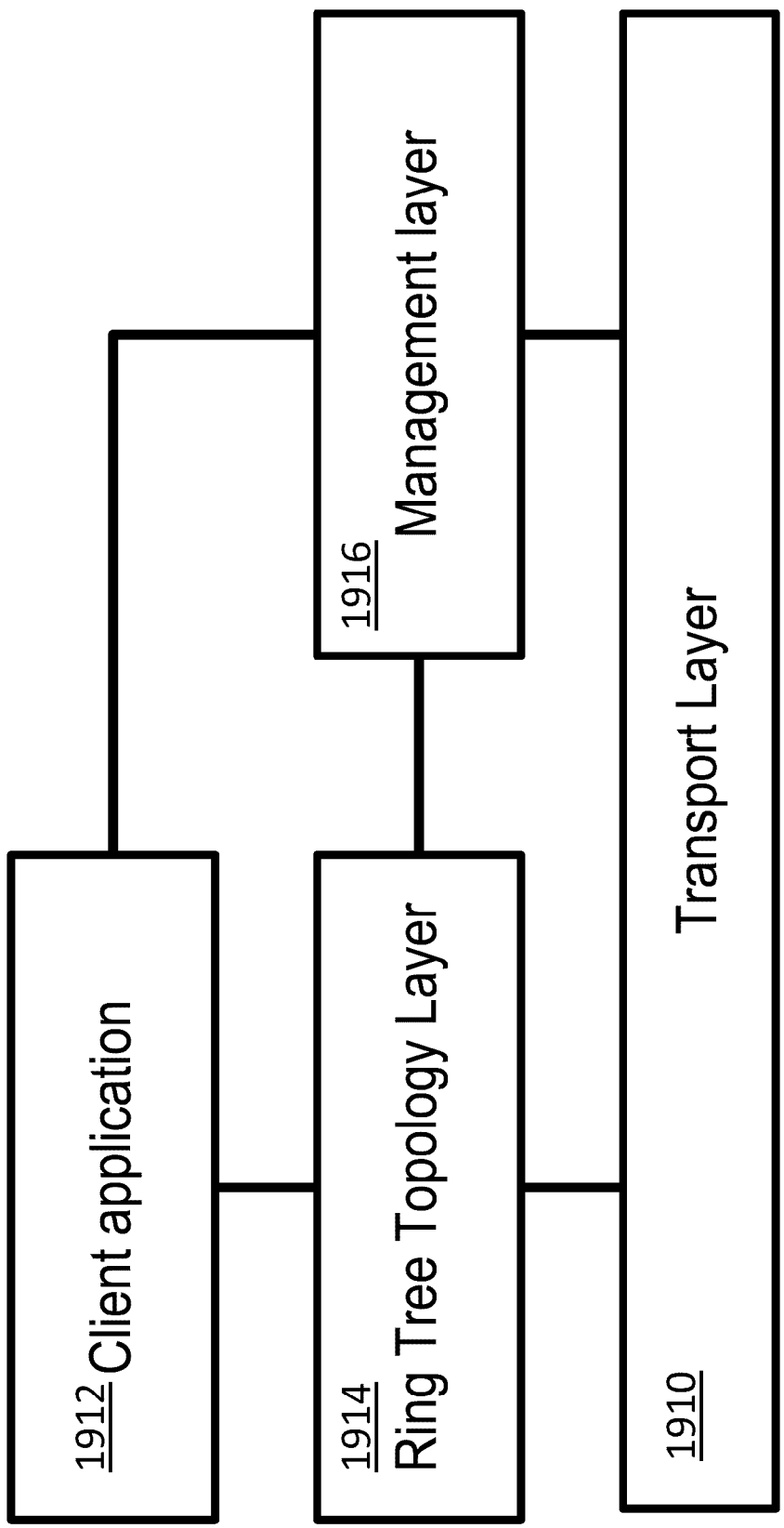
FIG. 19 is a diagram representing a subset of layers from the Open System Interconnection (OSI) model, according to one embodiment.

In FIG. 19 there is a diagram presenting a subset of layers from the Open System Interconnection (OSI) model. There is an OSI model Transport Layer 1910 and an OSI model application layer 1912. Between those two layers (1910 and 1912), there is a Network Topology Layer 1914 and a Management Layer 1916. According to one embodiment, the Network Topology Layer is a Ring Tree Topology Layer (RTTL) 1914 which will further be described in the following.

Transport Layer

The transport layer 1910 of the OSI model can offer any transport protocol such as Transmission Control Protocol (TCP) or User Datagram Protocol (UDP). Primitives of the RTTL 1914 use services provided by the Transport Layer 1910.

Application Layer

Each client application of the application layer 1912 uses services offered by the RTTL 1914 and Management Layer 1916. The primitives or commands necessary to use these services are detailed in the Ring-Tree Topology Layer section. One same client application can create different nodes in different communities or in a same community. So via the application layer 1912, it is possible to exchange information between different communities.

Management Layer

The management layer 1916 is responsible of maintaining the community in a transparent way to the application layer 1912. To manage the dynamic size of the community, each node has a role in maintaining the network.

According to one embodiment, each node is adapted to supervise the nodes listed in its neighbouring table in case one of neighbouring nodes disappears or disconnects from the network. When one of the neighbouring nodes disappears from the network, a node replacement rule or algorithm is applied and one of the nodes that supervised the disappeared neighbouring node is adapted to replace that node.

Depending on the replacement rule applied, according to one embodiment, it is the supervising node positioned at the highest ring level number that would replace a neighbouring node that disappears.

If a Parent leaves a ring, it will be replaced by another node of the same Ring.

Ring-Tree Topology Layer

The Ring-Tree Topology Layer 1514 (RTTL) can serve different types of client applications. This layer uses Transport Layer 1510 of the reference model OSI and offers services to the client application.

According to one embodiment, the RTTL allows a node to join a specific community that is identified by a community identifier. The node may use a command such as: "Join (CommunityID, ServerAddress)", where the parameter "CommunityID" is the community identifier and the parameter "ServerAddress" is the address of the server that manages the community.

According to another embodiment, the RTTL allows a node to get the IP address of another node for which the position ID in the community is known. The Address Resolution Message (ARM) messages are transparent to the Client Application layer 1512. So users of Client Application 1512 don't need to implement ARM protocol. The node may use a command such as: "ARM (CommunityID, ID)", where the parameter "CommunityID" is the community identifier and the parameter "ID" is the position of the node within the community. A node can use such a command to send a message to a particular destination node when the IP address of the destination node is unknown to the node. A node can also use such a command to update its list of neighbouring nodes for which the node is supposed to store the IP address.

According to another embodiment, the RTTL allows a node to send a unicast message to a node. The node may use a command such as: "Send_ID_Unicast (CommunityID, ID, message)", where the parameter "CommunityID" is the community identifier, the parameter "ID" is the position of the node within the community and the parameter "message" is the message that is to be sent to the node.

According to another embodiment, the RTTL allows a node to send a multicast message to a group of nodes. The nodes may use a command such as: "SendMulticast (CommunityID, destination, message)", where the parameter "CommunityID" is the community identifier, the parameter "destination" is the position of the parent node of which the group of nodes are the descendants and the parameter "message" is the message that is to be sent to the group of nodes.

According to another embodiment, the RTTL allows a node to send a broadcast to all the nodes of a community. The node may use a command such as: "SendBroadcast (CommunityID, message)", where the parameter "CommunityID" is the community identifier and the parameter "message" is the message that is to be sent to all the nodes of the community.

According to another embodiment, the RTTL allows a node to leave a community. The node may use a command such as: "Leave (CommunityID)", where the parameter "CommunityID" is the community identifier. It should be understood that a node that is part of more than one community could leave one community and still remain part of the other communities.

According to another embodiment, the RTTL allows a managing server or node to receive a message. The server or node may use a command such as "Receive (CommunityID)", where the parameter "CommunityID" is the community identifier.

According to another embodiment, the RTTL allows a managing server or a node to check on the total number of nodes in a community. The managing server or node may use a command such as: "NodesStat (CommunityID)", where the parameter "CommunityID" is the community identifier. This command returns the total number of participating nodes in a specific community. A skilled person will understand that it is also possible for this command to return other kinds of related information such as the maximum number of p levels and the maximum number of nodes n per level in the network, or a table of nodes for each of the p levels of the network for indicating the number of nodes that are present at each p level.

According to yet another embodiment, the managing server is adapted to authenticate new nodes, to provide a list of active nodes, to add new nodes or to reinsert an orphan node.

A skilled person will understand that a single managing server may be adapted to manage a plurality of communities or applications.

Functional Overview

Transparently to Client Application, messages can be transmitted from one node to another.

There are two types of messages: management messages and data messages. Management messages are messages that are required for building and maintaining the network of nodes or community. Data messages are messages that allow communicating information between nodes. Depending of their use, both management messages and data messages can be sent as Unicast, Multicast or Broadcast.

According to one embodiment, a message is sent from one node to a neighbouring node by following a ring path in any direction (i.e. clockwise direction or counter clockwise direction). In the case of a Unicast message, the message is sent from one neighbouring node to another until the message reaches the destination node. In the case of a Multicast message, the message is sent from one neighbouring node to another until the message has reached all destination nodes. In the case of a Broadcast message, the message is sent from one neighbouring node to another until the message has reached all nodes of the community.

According to an alternate embodiment, a message is sent directly from a first node to a second node. The first node can only send a message directly to the second node if that second node is a neighbouring node and is identified in the neighbouring table.

According to one alternative, the system can use the transport layer 1910 for sending the message. By using the IP address corresponding to the second node as stored in the neighbouring table, the first node can directly send the message to the second node. In one example, a Unicast communication uses a Ring Tree Internet Protocol (RTIP) for sending a message based on an IP address of the destination node.

According to another alternative, the system can use the RTTL 1914 for sending the message. By using the ID corresponding to the second node as stored in the neighbouring table, the first node can directly send the message to the second node. In one example, a Unicast communication uses a Ring Tree Identifier (RTID) for sending a message based on an identifier of the destination node.

Unicast Data Transfer

According to one embodiment, a node is adapted to send a message to another node using an RTID communication. The message is sent to a specific node position in the community irrespective of the IP address of the node occupying the position.

According to an alternate embodiment, a node is adapted to send a message to another node using an RTIP communication. The message is sent using an IP address of the destination node, irrespective of the node position or ID in the community. If a destination node changes its position in the community, RTIP messages will still reach the node whatever its new position contrary to RTID messages.

When it is required to send a message to a node irrespective of the node position in the community, the RTIP communication can be used. When the message is specific to a node position in the community, the RTID communication can be used.

According to one embodiment, to send an RTIP message, the Client Application uses primitive: Send_IP_Unicast (CommunityID, IP, message). To send an RTID message, the Client Application uses primitive: Send_ID_Unicast(CommunityID, ID, message). It is possible that in one Client Application, the creation of nodes and communication between different nodes are done across various communities, therefore in this embodiment the CommunityID is specified in the Unicast transfer.

A skilled person will understand that in a Client Application having only one community, the CommunityID parameter in the Unicast transfer can be omitted.

Multicast Data Transfer

Figure 20:
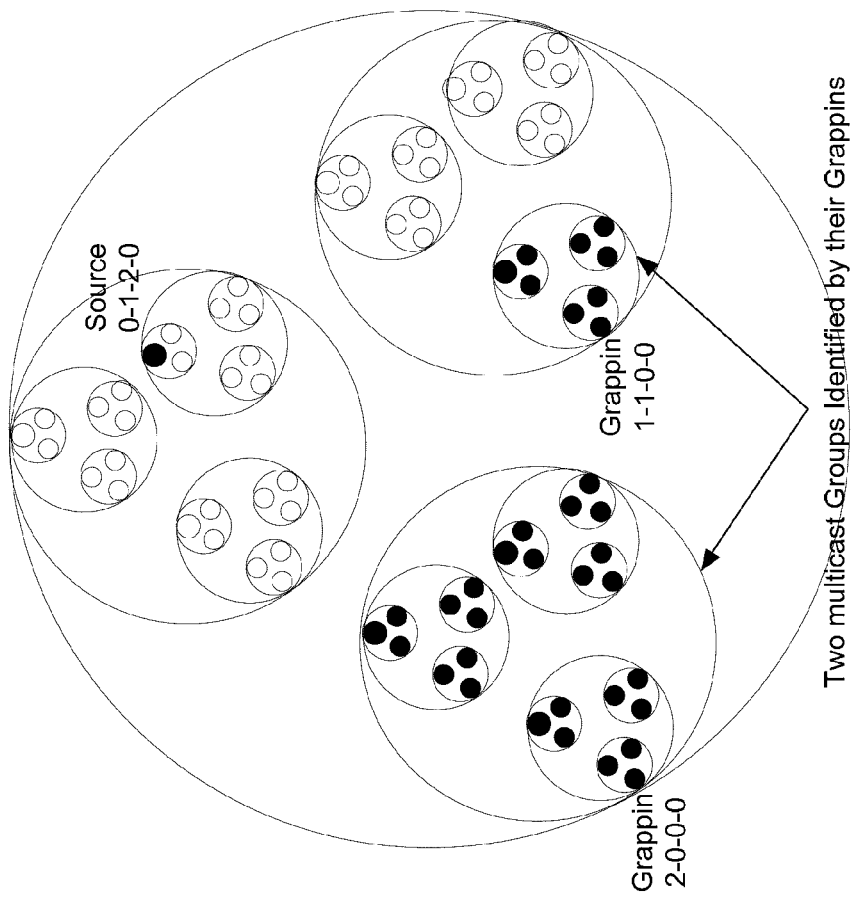
FIG. 20 is a representation of a three level ring-tree topology in which there is illustrated a sending of multicast message, according to one embodiment.

As presented in FIG. 20, it is possible to send a message to a group of nodes by selecting the Parent of the group as a message destination. In this case, a source node addresses a message to a Parent and specifies that the message is a multicast message, the Parent node then diffuses (Broadcast Descendant) the message as a multicast to its children on all levels but not their neighbours of the same level. Children who are also Parents of other levels diffuse the message as a multicast to their neighbours and to all their children and so on. This way, the multicast message can reach the Parent destination and all its descendants until leaf level.

In FIG. 20, there is illustrated a sending of multicast message according to one embodiment. Node 0-1-2-0 sends a multicast message to Parent 2-0-0-0. The Parent 2-0-0-0 receives the multicast message and in response re-transmits the multicast message to his children of all three levels. Node 0-1-2-0 also sends a multicast message to Parent 1-1-0-0. The Parent 1-1-0-0 receives the multicast message and in response re-transmits the multicast message to his children of all two levels.

According to one embodiment, the Client Application uses primitive: SendMulticast (CommunityID, destination, message) to send a multicast message. In this case, the field destination represents the Parent RTID of the Multicast Group.

Broadcasting

Figure 21:
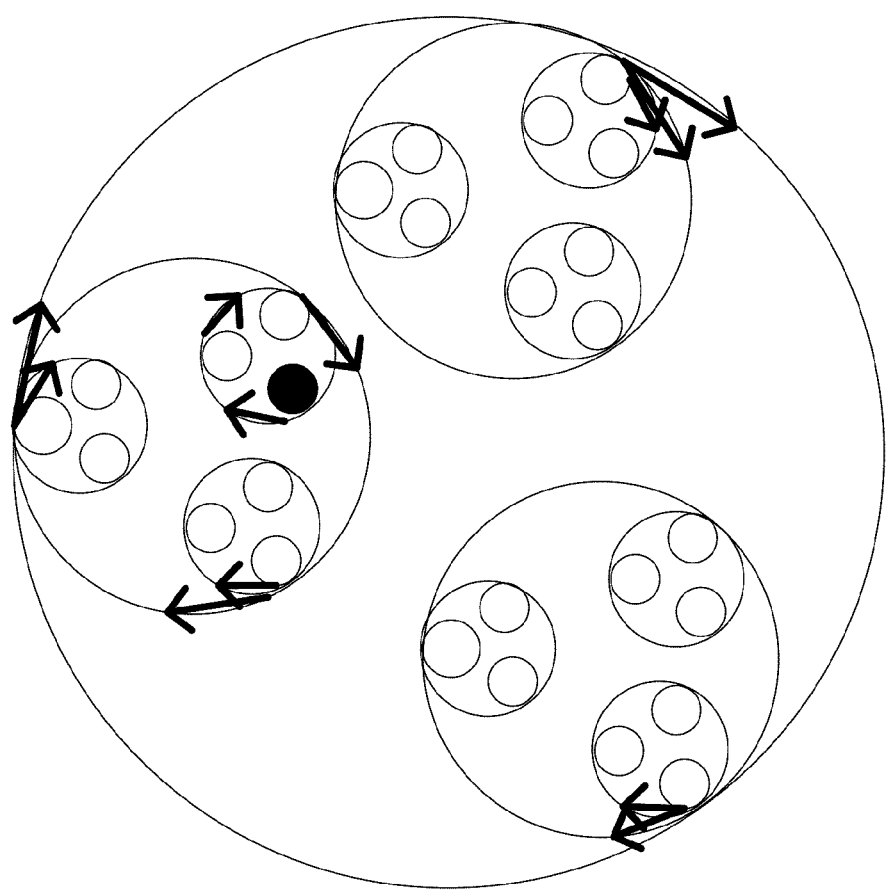
FIG. 21 is a representation of a three level ring-tree topology in which there is illustrated a sending of broadcast message, according to one embodiment.

It is also possible for a node to send a message to all nodes of the community by sending a broadcast message. As presented in FIG. 21, when a message is to be broadcasted, a node sends the message to its direct neighbours of all levels, in a predetermined direction (i.e. clockwise or counter clockwise). When a node that is a Parent receives the message, it retransmits the message to its direct neighbour of the same level and also to its direct neighbours of other levels (i.e. children nodes). Every node that receives the message, in turn retransmits the message to its direct neighbour or neighbours always in the same predetermined direction until all nodes in the community have received the message.

According to one embodiment, in each ring, the broadcasted message does come back to the node that initiated the messaging in the ring. The node that initiated a message in a ring adds its ID, so nodes know when the transfer has to stop. This is a way, for the node that initiated the sending of the message in a ring, to verify that the message reached all the nodes of the ring. So it will stop the transfer preventing the message to run forever.

According to one embodiment, if in a ring the node that initiated the messaging disappears before receiving the message, its precedent node will stop the transfer. The precedent node supervises a node presence and if the node disappears, the precedent node stops the message from being transferred infinitely in the ring.

It shall be understood that a parent node is a precedent node to all of its children nodes and that a child node is a precedent node to another child node of the same ring level, according to the message transfer direction. According to one embodiment, when messages are transferred within a ring in a clockwise direction, a first child node that is a precedent node to a second child node is located, on the same ring, immediately next to second node in an anti-clockwise direction. In this case, the first node considers itself as a precedent node if, in its neighbourhood table, there is a node at the right of its own ID.

If this node is situated at the end of a line in the neighbourhood table this node is the precedent node of the parent node of this ring.

A skilled person will understand that there are other known ways of preventing a broadcast message to run forever in the network. One well known mechanism is the use of TTL (Time To Live). For the Ring-Tree network, the TTL is defined in number of hops according to the following equation: $(n-1)(2p-1)$. Actually, to reach all nodes, a circular broadcast message takes a maximum average time of $(n-1)(2p-1)t$ with t is the average transmission time between two nodes. To send a message between the two distant nodes in the community when the network is full of nodes i.e. worst case for the broadcast transmission time, it takes a maximum of $(n-1)(2p-1)$ hops. This defines the TTL value.

According to yet another embodiment, a broadcast message is to send as a multicast message to the Root Parent. The message will reach all nodes of the community because the Root Parent will send the message as a multicast to all its children including Root nodes. The children will send the message as a multicast to their children and so on until reaching leaf nodes (see Multicast Data Transfer section).

According to yet another embodiment, a broadcast message is directly sent to a plurality of nodes. A sending node sends a message directly to all the nodes of the same ring and also to all the descendant nodes. If the sending node is situated as a child in ring level i, the sending node sends the direct broadcast message to all the nodes in ring level i and also to all the nodes in ring level i+1, and further on until ring level p-1. When a receiving node receives a direct broadcast message, the receiving node sends the message to all the nodes in all the rings to which it belongs except to the nodes of the ring from which it received the message. With this direct broadcast, a message may reach all the nodes in $n*p-1$ transmission time.

To send a broadcast message, Client Application can use primitive: SendBroadcast(CommunityID, message). Broadcast message can be done by any node even if the source doesn't belong to the community. This option can be disabled for security reason if necessary.

Aggregation of Messages

According to one embodiment, in order to unicast, multicast or broadcast a plurality of messages at once and each originating from different nodes, a parent node is adapted to aggregate into a single message the plurality of messages coming from its descendants and then send out the single message.

Community Management

According to one embodiment, a client application may use the command Join (CommunityID, ServerAddress) in order to join a network. The CommunityID must be recognized by the server. So, prior to using this primitive, the CommunityID must be defined on the server.

A Ring-Tree server administrator may add new communities on the server. According to one embodiment, the Join function contacts a server that returns a list of active nodes of the community. In a transparent way to the Client application, the Join function contacts one or many active nodes in order to join the community. Once the node is attached to the network, the network management will assure that the node will stay connected to the network despite the dynamic size change due to joining and leaving of nodes in the community.

According to one embodiment, each participating node can be a source or a destination and all nodes are routers. The maintenance of the system is assured by all participating nodes. Depending on the location of a node (i.e. parent or child), the role of the node may vary. For instance a parent node may be responsible of routing a greater number of messages than would a child node. Despite that some nodes can be charged in communication or in maintaining the network more than others, any node can assume any role in the community Node Identification Each node has a unique ID that represents its position in the whole topology. According to one embodiment, the length of the ID is p. So the ID contains p fields separated by dashes "-", p is the maximum number of levels of the network. These fields, from left to right, represent level 0 to p−1 respectively. Value of each field vary from 0 to n−1, where n is the maximum number of nodes in a ring. Number "0" represents a parent node, other numbers increments in clockwise direction, represent child nodes. So each node has a position number in its ring and its ID represents its position in the network.

As each node is a child in only one level, this level defines the level of the node. For example: in a topology T(n=5,p=10) a node of level 4 means that this node is a child on level 4 and it is a parent on all levels higher than 4. For levels under 4, it inherits all the position of its parent.

Examine, from right to left, the values of an ID of a given node: while there is zeros it means that the node is parent of those levels. The first value different from zero determine the level of the node and it actually means that the node is a child in this level and the value specifies its position in its ring. Values that come after determine the positions of its parent, its grandparent, its great grand parent, etc until the Root parent.

When a newcomer node joins the network, its parent gives it an ID indicating the ring level where it is placed as a child, the position in the ring and the parent's position so the newcomer will know where it is situated in the whole network. The newcomer completes its ID by zeros specifying that it's a parent for higher levels. For example: in a topology T(n=3, p=5) when a newcomer receives the ID [0-2-1] the node will complete this ID by zeros, the ID becomes: [0-2-1-0-0]. By examining this ID we conclude that this node belong to a community with p=5 levels (because there is 5 fields in the ID) numbered from 0 to 4. It also means that the node is a parent in the 4th and the 3rd levels because the fields in position p−1 and p−2 have the values of "0". The node level is 2, because it is a child in a ring of level 2 (level number p−3), it is placed on position 1 because the field on position 2 has the value of "1", its parent is placed in 3rd position in level 1 (level number p−4) and its Grandparent is the Root Parent (it has number "0" of root level).

Neighborhood Table

Each node retains limited information about the network. So a given node maintains a table containing information about n×p members. Those members are related to the node and the table contains IP addresses and other information about them. Actually, a given node have information about all its children (i.e. on all levels), parent, uncles, grand parent, grand uncles, great grandparent and great grand uncles until the nodes at the root level. They don't hold information about the children of their: uncles, grand parent, grand uncles, great grand parent, great grand uncles, and so on until the root nodes. So the root nodes themselves are known but not necessarily all their children.

All nodes hold information about the root nodes but root nodes don't hold information about all the other nodes. A root node can be seen as a famous person known by everyone but this famous person don't necessarily know everyone. If the position of the nodes is closer to the root, the node is more important and it will be known by more nodes.

When a newcomer node joins the network, its parent gives him an ID indicating its position in the network. It also gives him part of its neighbourhood table. Actually, the newcomer share the lower part of the table with its parent i.e. it shares the same information from level number 0 (root) to level number (i−1) where i is the node's level. The rest of the table will be filled by information about future children of the newcomer. But at this point, this part of the table is left empty because the node doesn't have children yet. At leaf level i.e. level number p−1, nodes of the same ring have similar tables because a leaf node cannot have children so it will inherit the whole table from its parent.

Figure 22A:
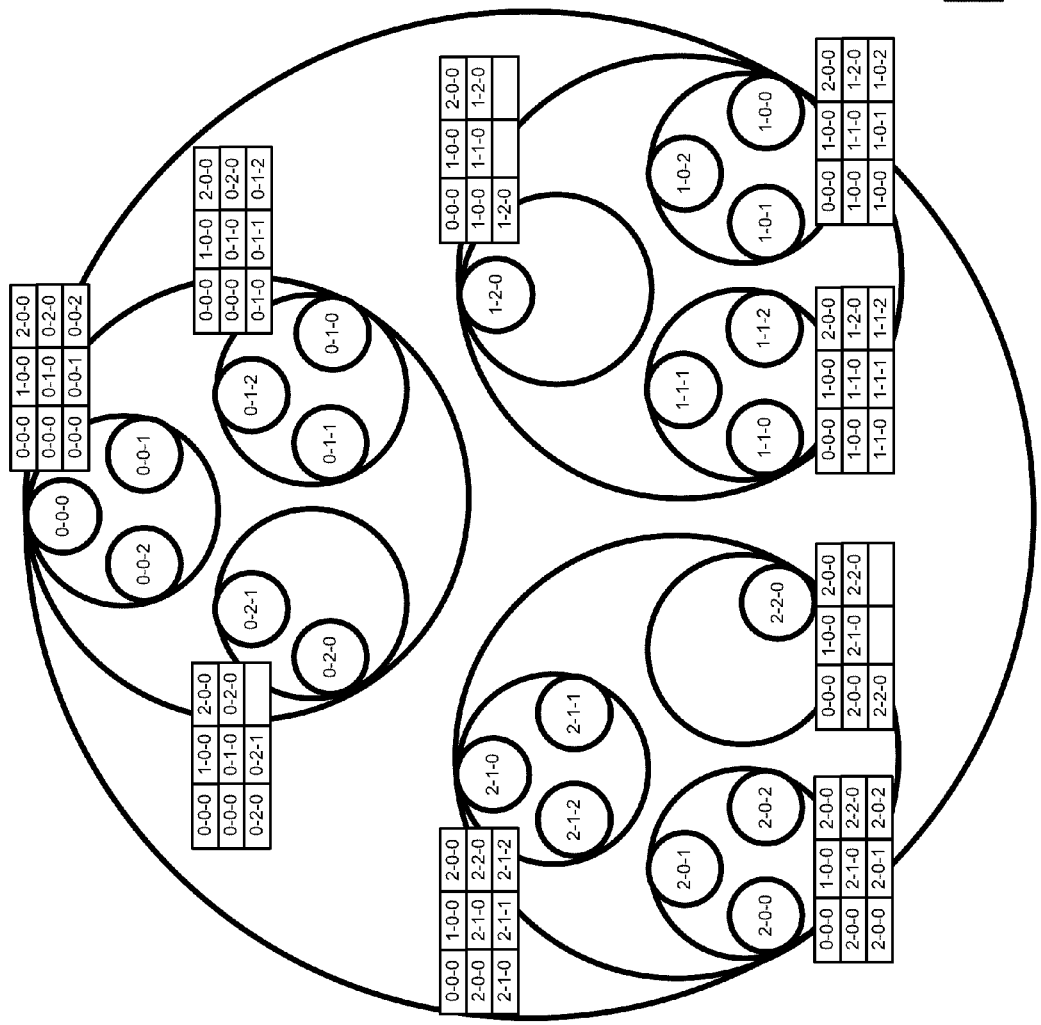
FIG. 22A is a representation of a three level ring-tree topology in which there is illustrated a neighbouring table corresponding to each of the nodes.

Presented in FIG. 22A, is a network T(n=3,p=3) according to one embodiment. This network can have a maximum of $N=n^p=3^3=27$ nodes, but it only has 22 nodes, there are still some available places, this is why some tables are not fully filled. In this network, there is one ring on level number 0, three rings on level number 1 and nine leaf rings i.e. on the leaf level number 2. At leaf level, nodes of one ring share the same table, that's why the table is represented only once for each leaf ring. So we have a total of nine different tables in this example. Each field in the table can have other information than the IP address, such as an identifier of the node, a ring level indicator or a ring position indicator. Here, only the IP addresses are stored in the table, the ring level indicator and position indicator are determined by the IP addresses' position in the table.

According to one embodiment, there is a local node identifier table corresponding to the neighboring table. The identifier table is created locally at each node according to the corresponding neighboring table and holds corresponding node identifiers such as IP addresses.

Because, root nodes are great grandparents and great grand uncles to all leaf nodes of the network, all nine tables share the same first line which is contain information about those root nodes. Consider node number 0-1-0. This node shares the same first two lines with node number 0-0-0 and only the 3rd line is different, because, the 3rd line contains information about the children of node number 0-1-0 where node number 0-0-0 doesn't know. Actually, a given children knows its uncles, grand uncles, grandparents, all great grand uncles and all great grandparents, but they doesn't know this children. This means, in the example below, node 0-1-1 knows or hold information about its uncle 0-2-0 but 0-2-0 doesn't know 0-1-1. Node 0-0-0 knows all its direct children 0-1-0, 0-2-0, 0-0-1 and 0-0-2, but it doesn't know its grandson 0-1-1, 0-1-2 and 0-2-1.

The neighbourhood table is used for Unicast, Multicast and Broadcast transfer. It is also used to maintain the network. The table must be updated each time a node join the network or disappear from it.

According to one embodiment the neighbouring table size properties (i.e. value of n and p) are set according to a destined application of the ring tree. In applications that are mostly used for broadcasting messages a neighbouring table size allowing to perform robust broadcast may be desirable. In applications that require a shorter broadcasting time a neighbouring table size allowing to perform timely broadcasting may be desirable. In applications that have nodes with a limited amount of memory, a reduced neighbouring table size may be desirable.

Mutual and Non-Mutual Knowledge

Figure 22B:
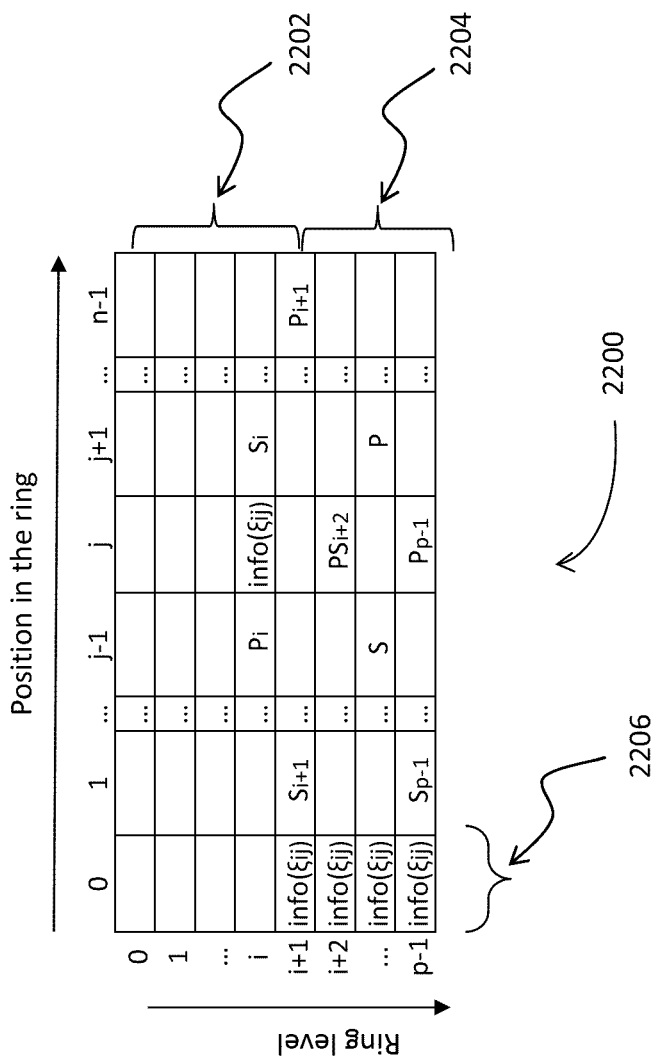
FIG. 22B is illustrated a neighbouring table corresponding to a node.

According to one embodiment as presented in FIG. 22B, a neighboring table 2200 has a node information at position (i, j) presented as "info($\xi$ij)". All node information at positions indicated by section 2202 is shared by all the nodes of ring level i. Node information at positions indicated by section 2204 is node information of the descendants of node which are positioned at higher ring levels (i.e. ring levels i+1 to p−1). Node information in column 2206 contain node information of the parent nodes of at ring levels 0 to i. The column 2206 also contains node information of at ring levels i+1 to p−1, since ξij is a parent node for those levels.

In the neighboring table 2200 of FIG. 22B, there is shown that there is mutual knowledge between node and the nodes that appear in all ring levels from i to p−1. This means that both the node and a node of the table at ring level i to p−1 keep information about each other. However, there is non-mutual knowledge between ξij and the nodes that appears in all levels from 0 to i−1. Since node ξij keeps information about those nodes but those nodes do not keep any information about ξij.

Precedent and Next Node

Further presented in FIG. 22B, there a precedent node Pk and a next node Sk in which k varies between 0 and p−1. The precedent of node ξij is located at position j−1 of ring level i, that is the first node located on her left in the neighboring table and indicated as Pi. If ξij was the first node of the line i, the precedent would be the node situated at the end of the same ring since every line of the neighboring table corresponds to a ring of the network. The next node of node ξij is the first node located on her right side in the table and indicated as Si. If ξij was the last node of the line i, the next node would be the first node in the same ring i.e. the node situated at position j=0 of the same line i (i.e. parent node).

Note that if the node ξ is alone in a ring, it would not have a precedent nor next node in the same ring. However, if there is one other node than ξ in a ring, that node would be both precedent and next of node ξ.

Let j be the position of node ξ and k the position of precedent node, k belongs to the set of node IDs existing in the same ring as ξ, k is determined as follow:

If $j>0$ min$(j-k)$ where $k<j$

If $j=0$ max$(k)$, where $k<n$

Let j be the position of node ξ and u the position of next node, u belongs to the set of node IDs existing in the same ring as ξ, u is determined as follow:

If $j<\max(u)\min(u-j)$ where $u>j$

If $j=\max(u) u=0$

Therefore, in each ring a node can have a maximum of p−i precedent and p−i next nodes.

Node Level

A node ξ is a child in only one level. This level defines the level of the node. In this case level i defines the level of node ξij.

Protocol Data Unit (PDU)

There are two types of PDU: Management PDU and Data Transfer PDU. The Management PDU type is used to exchange all necessary data for the distributed management system. The data transfer PDU type is used to send all necessary data for the application using the system. According to one embodiment, here is a list of data transfer PDU messages: unicast, multicast, broadcast and ARM. According to another embodiment, here is a list of management PDU messages: Status (to ensure that a neighbour is still connected. It is necessary to detect unexpected failure), Join (to add a node to the community), Leave (to quit a node from the community), Link (to insert a node in a ring) and Multicast.

Unicast Data Transfer Specification

Prior of sending a message via RTIP Unicast, similarly to ARP message, a node must send an address resolution message (ARM) to get the IP of the node that occupy a geometrical position in the network. This means that the source must at least knows the ID of the destination and send an ARM message. Once source node has destination's IP node, it can exchange messages directly using traditional IP protocol without passing by the Ring-Tree network for routing. Source node may know the IP of destination without the need of sending an ARM message. For more details see ARM protocol specification section.

To send RTID Unicast message, the source node may have information about the destination node in its neighbourhood table. If not, the source compares the destination's ID with information that hold in its neighbourhood table and then it will choose the nearest node to the destination to act as a router. Messages then will transit via this node. If the selected node doesn't have the IP of the destination, it will choose the nearest node to the destination to act as a second router and so on until reaching the destination. Contrary to ARM message, IP of the destination node is not returned to the source. Communication between source and destination must pass by the chosen routers. If not an IP Unicast can be used. With this kind of communication if the destination disappears or leave the network, its substitute will receive the messages.

To choose the nearest node to the destination, a source compare the destination's ID with the IDs present in its neighbourhood table. Comparing from left to right, the node that have the more values in common with the destination's ID will be the nearest node to the destination i.e. it will be the selected router.

ARM Protocol Specification

ARM messages are necessary in case we need to know the IP of a given node when the ID is known. Contrary to ARP, ARM message is not a broadcast message. The source node knows the position of the desired node, it may have its IP directly from its neighbourhood table. If not, it can send an ARM message to the nearest node that knows the destination node's IP. But before that, it adds its IP to the ARM message so when a node that retain the desired IP receive the request, it will return the desired IP directly to the source.

The same algorithm for ID Unicast can be used to find the nearest node but the difference here is that the nearest node will simply return the IP if it has it or re-route the ARM message to the nearest node to destination that exist in its neighbourhood table and son on until reaching a node that knows the destination's IP. Once a node has the destination's IP it will send it directly to the node that initiated the ARM message.

Multicast Data Transfer Specification

There is two type of Multicast in Ring-Tree Network: Ring-Tree IP (RTIP) Multicast and Ring-Tree ID (RTID) Multicast. With RTIP, the source sends an ARM message to get the IP of the destination Parent. And then, it will send multicast messages directly to the destination. In the message it is specified that the message is a Multicast. Once the Parent receives the message it will diffuse it as a multicast message to all its children on all levels. Children that are Parents will diffuse it to all their children and so on until reaching leaf nodes. With RTID, the message may be routed via many nodes before arriving to destination as in the case of ID Unicast described in the Unicast data transfer specification section. In RTID, the multicast Group will continue receiving multicast messages even if the Parent disappears or leaves the network.

Broadcasting Data Transfer Specification

To send a broadcast message a node sends a message to its neighbour and all its children. When the message arrives to its parent, it sends it to its neighbour and all its children. So the message will reach the Grandparent of the source as well as all its children. When the Grandparent receives the broadcast, it will send it to its neighbour and all its children and so on until reaching all nodes of the network. In each ring, the node that initiated the message adds its ID so others nodes know when to stop resending it. To know the IP of neighbour and all children, a node uses its neighbourhood table.

Management Protocol Specification

Overview

According to one embodiment, the management system is distributed i.e. each node is responsible to manage the system. Status update messages are sent by all nodes at regular intervals, this allows other nodes to know that their neighbours still alive.

To reduce the cost in terms of bandwidth on each node, it is necessary to reduce the size of management messages and the overhead.

According to another embodiment, each parent node sends a status update message to all of its children at regular intervals. This allows the children nodes to know that their parent is still alive.

Network Formation

Topology Bootstrap

When a newcomer wishes to join a community, it contacts a server or a Ring-Tree Server (RT-Server) in order to get a list of active node members. According to one embodiment, the newcomer is adapted to send a join request to any member of the list. However, as each Ring can only have a maximum of n members, the Ring maybe full and the newcomer must try to join another member of the list.

According to another embodiment, the list of active node members includes only active node members of non-full Rings. The list can be updated on the RT-Server by parents that still have available places in their rings.

The RT-Server may have additional responsibilities. According to one embodiment, the RT-Server can validate if a node is allowed to join a community before supplying the list of active nodes. Other security functions can be added at the server level.

According to yet another embodiment, the RT-Server can also supply statistical information about the nodes such as the total number of registered nodes, the number of nodes online for each community, etc.

The newcomer is adapted to be inserted as a member in a free place of the selected non-full Ring. There is then assigned to the newcomer a position that serves as an ID number in the Ring. It will inherit part of the ID of its parent and the rest of the ID fields will be filled with zeros. If the newcomer occupies a position other than a leaf node (i.e. it can have children), the newcomer is then adapted to send its IP to the server to be part of the Non Full Active Member List for in turn receiving newcomers.

According to yet another embodiment, when for a given parent, rings of all levels are full, the parent informs the server that it is full so its ID is retreated from the Non Full Active Member List.

It is understood that all members don't need to know about the newcomer. The newcomer will be known by only the members of its own ring and all children of its neighbour. So in the best case scenario only 1 member will be updated. But if some parent's neighbourhood table are modified, they need to update their children's neighbourhood tables.

It is further understood that the newcomer is adapted to share the same lower part of the neighbourhood table with nodes of the same Ring where inserted. Besides serving for routing, this table serves the newcomer, in case of failure, to contact one of the parents node to stay connected to the network.

Topology Recovery

For reducing center point failure problems such as commonly found in tree based architecture, according to one embodiment, the Ring-Tree network is partitioned if all root nodes disappear at the same time. The probability for that to happen is $\alpha^n$, with $\alpha$ the probability for a node to disappear and n is the number of nodes on root level.

A skilled person will understand that in a Ring-Tree network, the more there are root level nodes, the more the network is reliable.

Node Failure Recovery

Figure 23B:
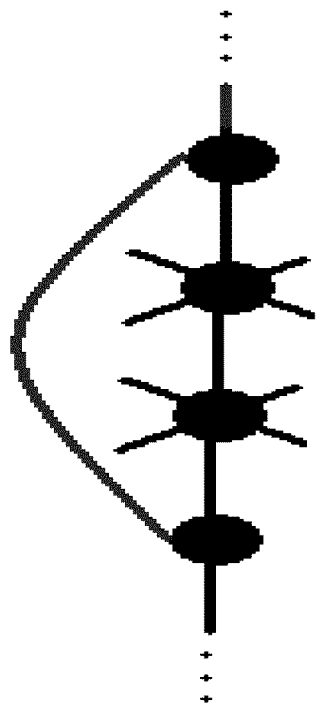
FIG. 23B is a prior art graphical representation of a multi-node failure inside a ring.
Figure 23A:
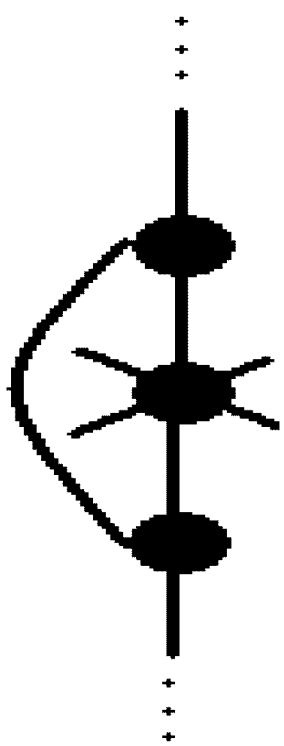
FIG. 23A is a prior art graphical representation of a single node failure in a ring topology.

Presented in FIG. 23A is a graphical representation of a single node failure in a ring topology, according to the prior art. If a non-Parent node disappears, its precedent neighbour stops receiving "status update" message. Then its precedent node will simply contact the next node to reform the ring. It will update the neighbourhood table and send it by multicast to all affected nodes. No additional overhead is required and the ring is then ready to accept a new member replacing the disappeared node. If there is no other node in the ring, the node which left will be the only node in the ring.

Presented in FIG. 23B is a graphical representation of a multi-node failure inside a ring, according to the prior art. If a multiple non-Parent node disappears, a precedent neighbour will stop receiving "status update" message. Then it will contact the next node until reaching a node that will reply and reform the ring. It will update the neighbourhood table and send it by multicast to all affected nodes. No additional overhead is required and the ring is then ready to accept a new member replacing the disappeared nodes. If there is no other node in the ring, the node which left will be the only node in the ring.

Figure 24:
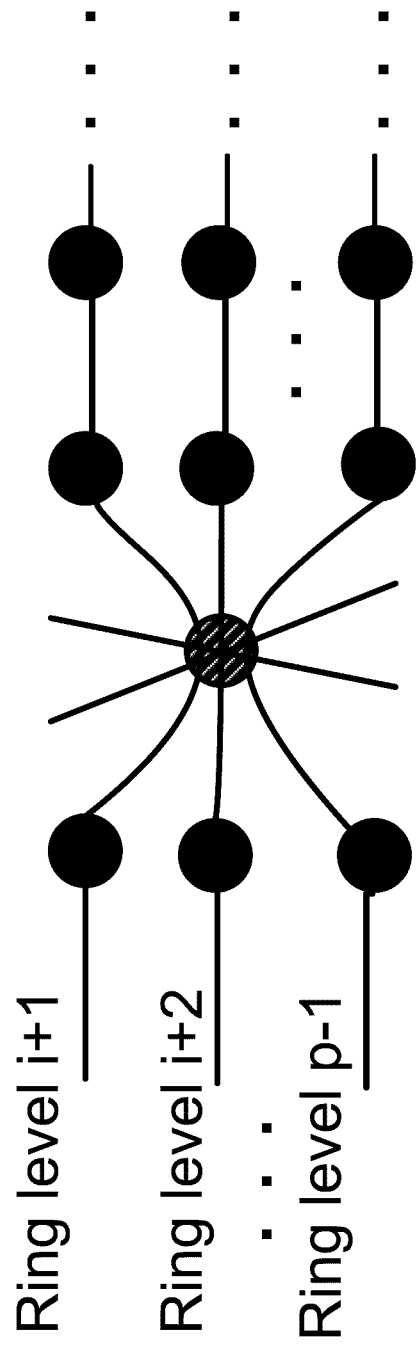
FIG. 24 is a graphical representation of a parent node failure in a ring-tree topology, according to one embodiment.

Presented in FIG. 24, there is a graphical representation of a parent node failure, according to one embodiment. When a parent node disappears, this will be detected by precedent nodes on all ring levels related to the parent node. The precedent becomes an active orphan (i.e. a node that has lost its parent); it will send a multicast message to all the affected nodes asking them to change their state to passive orphan (i.e. a node that has lost its parent or a parent at a lower level).

In FIG. 24, the precedent of the disappeared parent node is an active orphan node and the children of the disappeared parent node are passive orphan nodes that are in a wait state.

Figure 25:
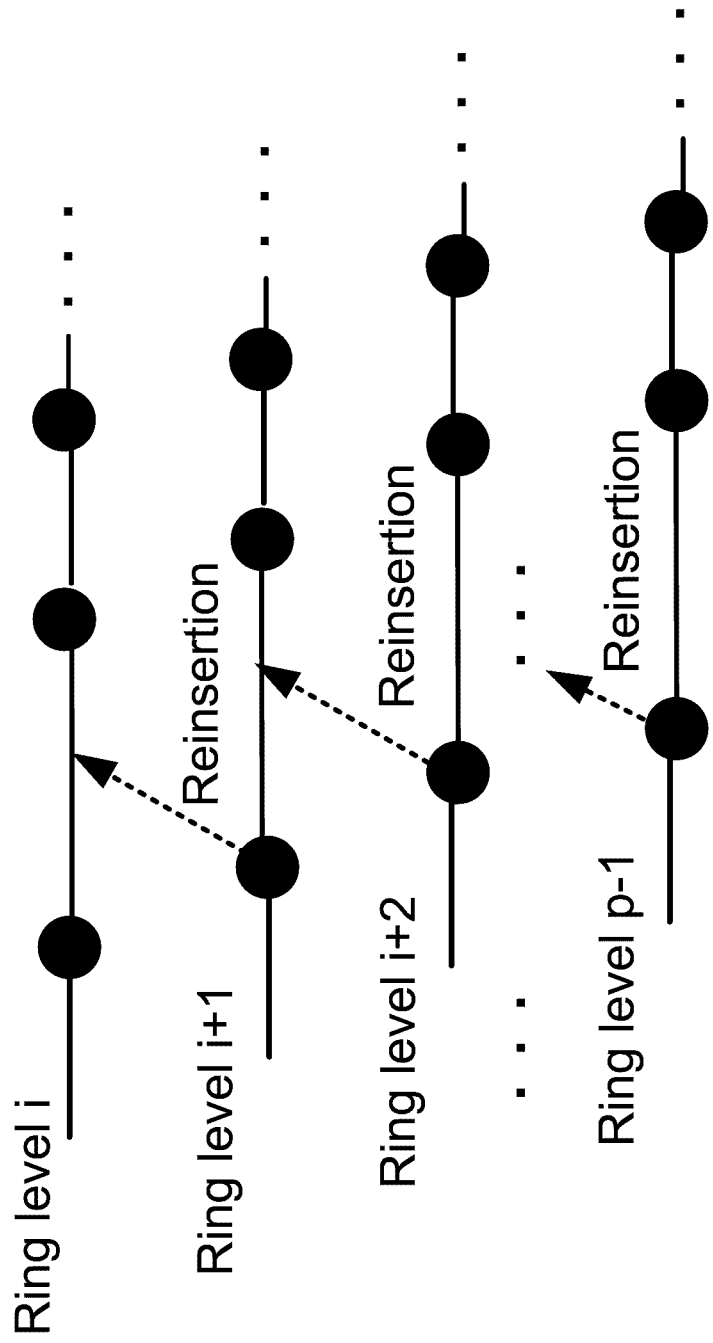
FIG. 25 is a graphical representation of a network insertion sequence, according to one embodiment.

Presented in FIG. 25, there is a graphical representation of a network insertion sequence, according to one embodiment. If a parent node of ring level 0 disappears, a child node on ring level 1 (referred herein after as the chosen precedent node) is inserted in the ring level 0. The chosen precedent node has in its neighbourhood table the IP address of its uncles (i.e. nodes on level 0), and is adapted to contact the uncles in order to request an insertion at level 0.

According to one embodiment, the lower level ring (ex.: ring level 0) that lost a node (i.e. disappeared Parent node to ring level 1) will not accept newcomer after a timeout is passed in order to give priority to the chosen precedent node to be inserted in the ring. If the chosen precedent node doesn't succeed to join the lower level, it will try with another lower level until succeeding to join.

According to one embodiment, if after trying to join all lower levels including root level, it will consider itself partitioned and inform all its descendants of the partitioned status. When in the partitioned status, the descendants are adapted to re-contact the server to re-join individually.

If the Parent node is a Parent for many levels then all the rings will run the same algorithm to join a lower level. When a parent to an X number of levels disappears, the X rings will be disconnected from the network. In order to rejoin the network, a chosen precedent node of each disconnected ring will contact at least one lower level in order to be reconnected to the network separately.

Figure 26:
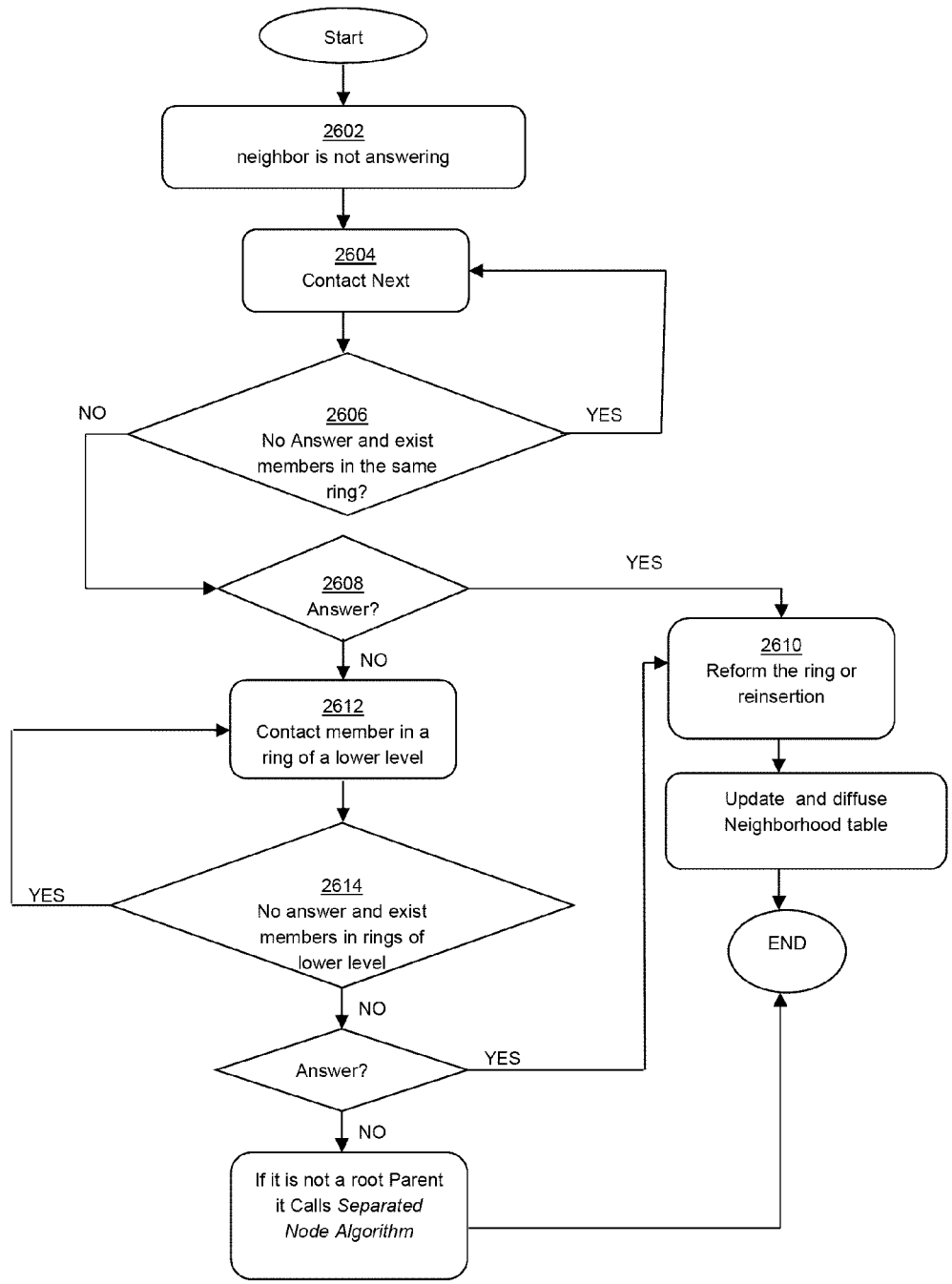
FIG. 26 is a flowchart presenting the steps to resolve node failures, according to one embodiment.

In FIG. 26 there is a flowchart presenting the steps to resolve node failures according to one embodiment. At step 2602, there is discovered that a node is not answering and that the node disappeared. At step 2604, the next node according to the neighbouring table is contacted (i.e. following the spiral representation of FIG. 27). At step 2606, there is verified if the contacted node is present in the network and if that contacted node is not present, there is verified if there are other nodes in the same ring. If there are other nodes in the same ring, a next node of the ring is contacted according to the neighbouring table as in step 2604. If there are no other nodes in the same ring, at step 2608, there is verified if the contacted node is present. If the contacted node is present, at step 2610, the ring is reformed.

Figure 27:
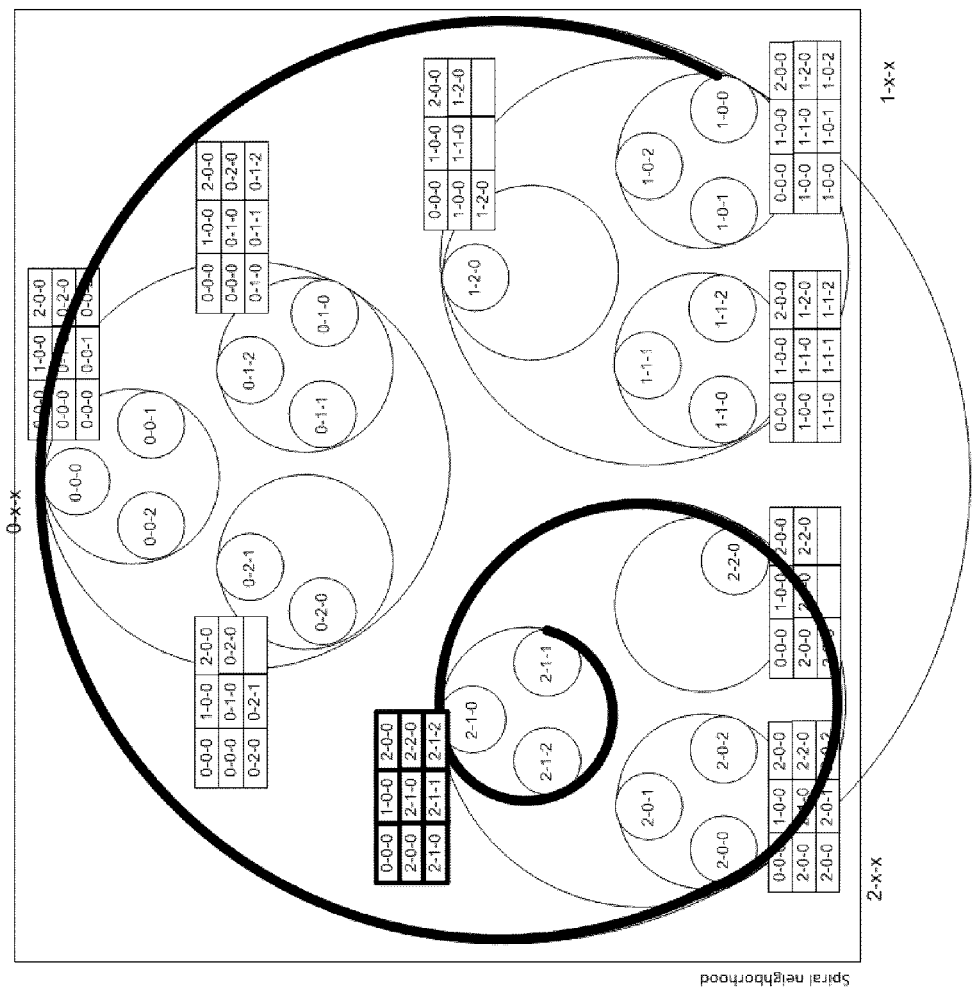
FIG. 27 is a representation of a three level ring-tree topology in which there is illustrated a neighbouring table corresponding to each of the nodes and the spiral communication path according to the neighbouring table of one node, according to one embodiment.

If the contacted node is not present, at step 2612, a node of a ring at a lower level is contacted according to the neighbouring table (i.e. following the spiral order as presented in FIG. 27). At step 2614, there is verified if the contacted node is present and if that contacted node is not present, there is verified if there are nodes in a ring at a lower level. If there are nodes in the ring of lower level, a next node of that ring is contacted according to the neighbouring table as in step 2612, and so on until reaching the lowest level (i.e. root ring).

According to yet another embodiment, there is a precedent node that detects that a next node is disconnected. The precedent node informs the central managing server that the next node is disconnected. The central managing server manages (by updating the neighborhood table, by managing reinsertion, etc.) the precedent node according to its position in the network topology and attempt to manage its recovery if required.

Node Join

Figure 28A:
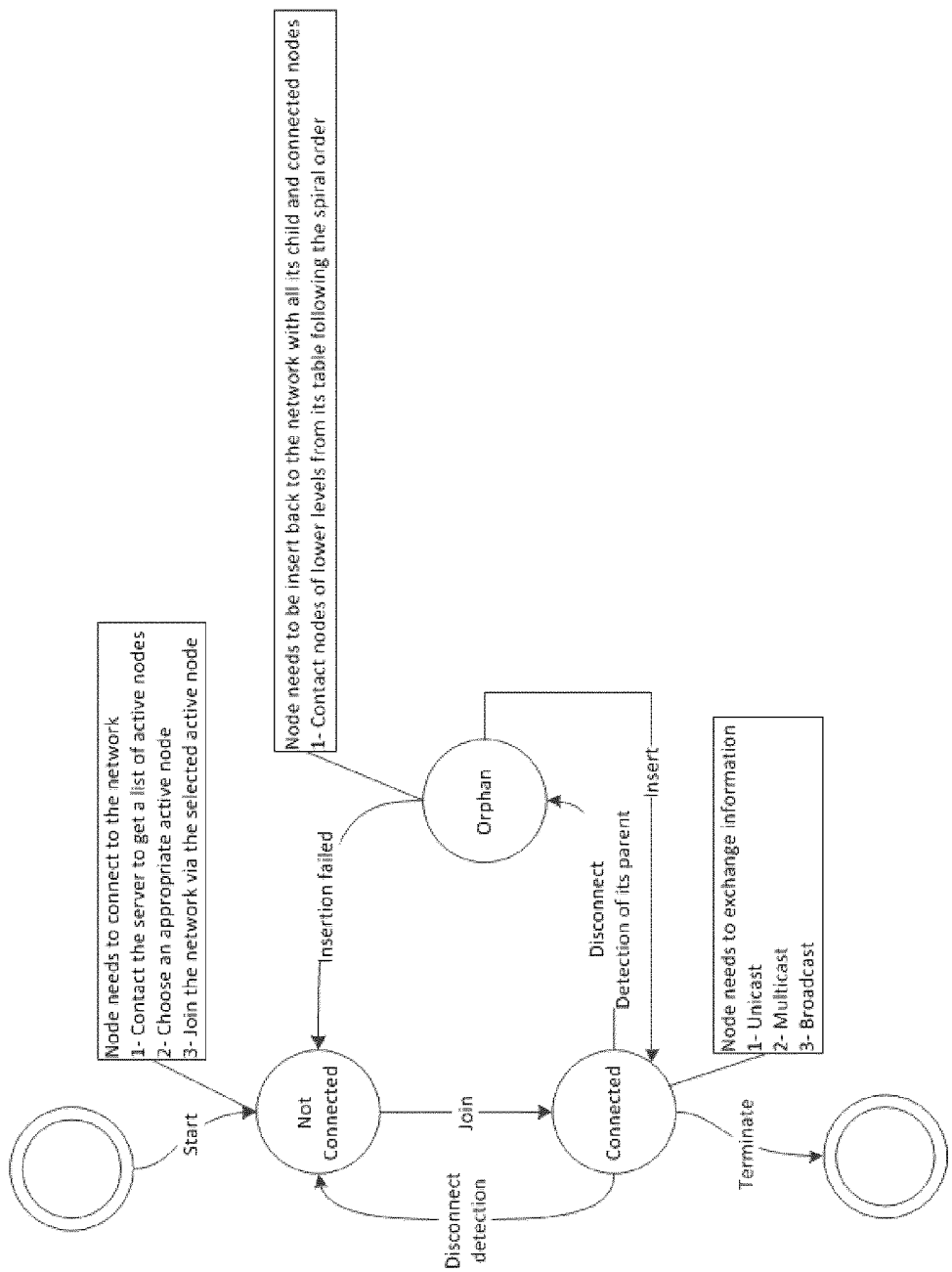
FIG. 28A is a state diagram of a node representing a node join to the network, according to one embodiment.

Presented in FIG. 28A, is a state diagram of a node representing a node join to the network, according to one embodiment. When in the not connected state, the node contacts the server to get a list of active nodes or the addresses of a set of appropriate active nodes. Based on a predetermined selection criterion such as a ping test, the server chooses an active node or a set of appropriate active nodes for allowing the node to join the network via the active node or via one node from the set. Once the node is connected to the network, the node is able to communicate with other nodes of the network through a unicast, multicast or a broadcast of information.

Once the node joins the network it receives, from its parent, an ID representing its position in the network at level i (where i is between 0 and p−1); it also receives part of its parent neighborhood table (i.e. lower part of the parent table from level 0 to level i, i is the level of the node).

When the node drops out of the network, the node may attempt to re-join the network. According to one embodiment, the node is adapted to contact a selected node of lower level according to the neighbouring table (i.e. following the spiral order as presented in FIG. 27) for joining the network via the selected node.

Figure 28B:
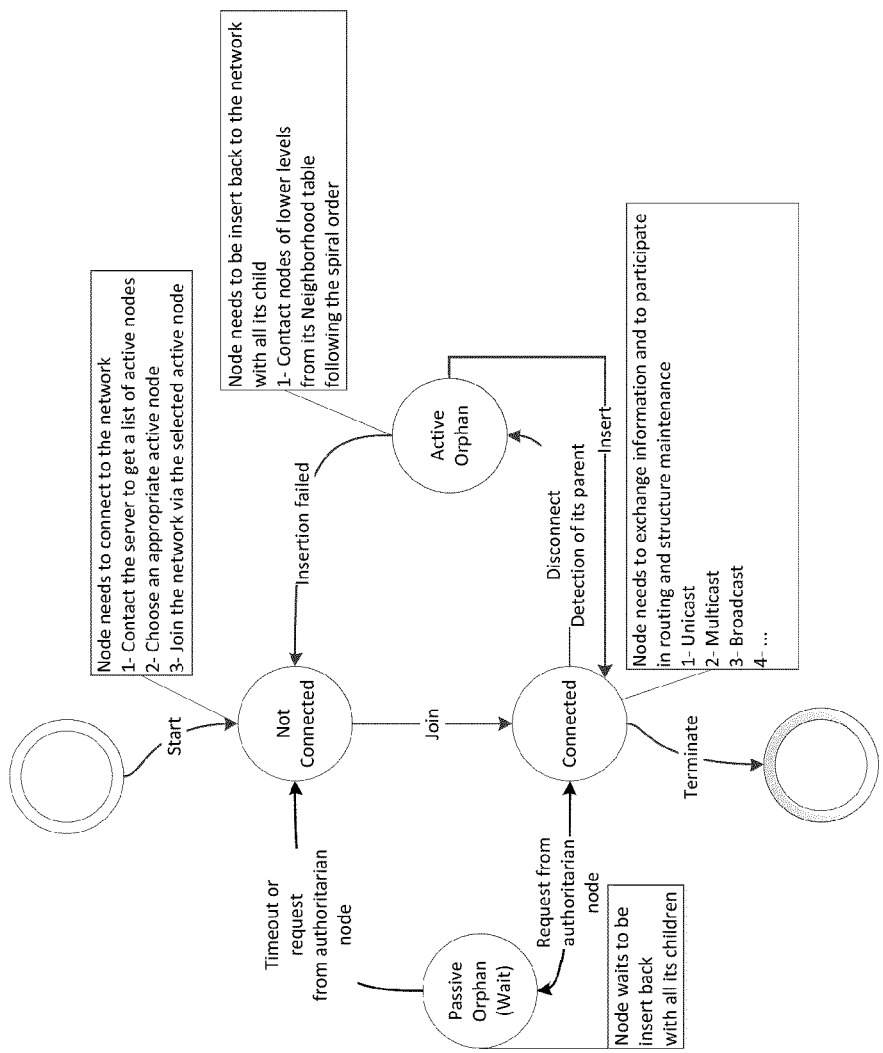
FIG. 28B is a state diagram of a node representing a node join to the network, according to one embodiment.

According to yet another embodiment, as presented in state diagram of FIG. 28B, when an attempt to insert the active orphan (i.e. the precedent of the disappeared parent node) fails, the active orphan sends a message to all the passive orphan (i.e. the children and children of higher levels of the disappeared parent node) to inform them that they are disconnected from the network. The passive orphan may then try to connect to the network on their own or pass to a non-connected state.

Topology Expansion

According to one embodiment, the RT topology T is characterized by its n and p parameters $T_{n,p}$. It is possible to modify these parameters dynamically to pass from topology $T_{n,p}$ to $T_{n+i,p+j}$.

In order to expand the size of the network all nodes must be informed by a trusted and authorized source such as the RT server. The RT server already has this information and it must be informed by any modification of the n and p values. Recall that the RT server informs each newcomer node by the value of these parameters as those values can be different for different communities.

Once a node is informed by the new values of n and p parameters it is adapted to expand the size of the neighbourhood table in order to allow more nodes to enter the network.

The topology expansion is easier than the topology reduction. Because when the size of n or p is decreased it may cause some nodes to leave the network and try to relocate later.

Node Modules

Figure 29:
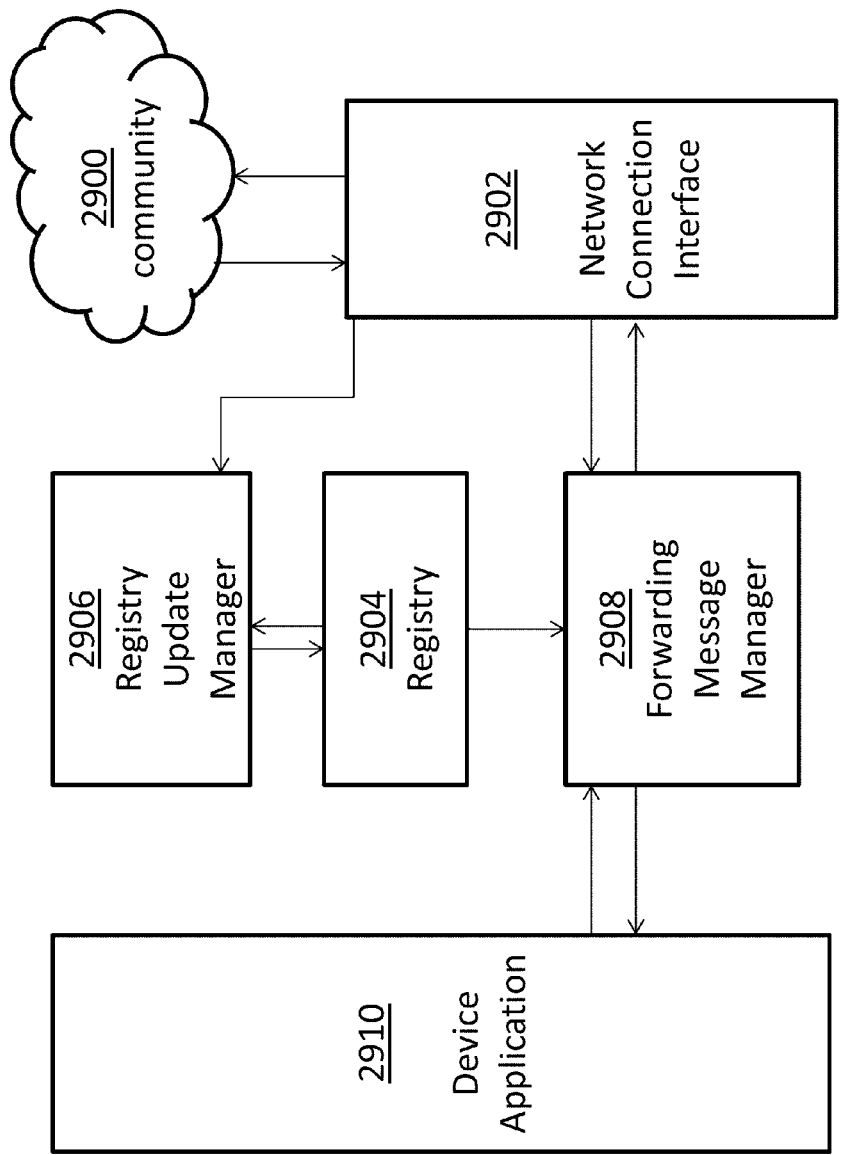
FIG. 29 is a block diagram representing the modules of a node, according to one embodiment.

Presented in FIG. 29 is a block diagram representing modules that may be found in a node or network node device of the system 2900 described above. The network node device has a network connection interface 2902 to communicate with other nodes of the system 2900. The interface 2902 is related to a network address such as an IP address.

The network node device further has a registry 2904 of connectable node devices. The registry 2904 is adapted to store node device network address and identifiers each representing a node device of the system or community 2900. The identifier is indicative of the ring network level and ring network position of the corresponding node device according to the overlay network topology system 2900.

The network node device further has a registry update manager 2906 adapted to modify the registry 2904 when a change in the community occurs due to drops, adds and moves of node devices that affect the registry 2904.

The network node device further has a forwarding message manager 2908. The forwarding message manager 2908 is adapted to receive an incoming message via the network connection interface 2902 and to handle the incoming message in accordance with a content of the incoming message and the registry 2904.

When the network node device is a parent node the forwarding message manager 2908 is adapted to send an outgoing message according to the incoming message to a plurality of node devices of the registry 2904, each having a node position on a different one of the rings that are linked by the network node device.

When the network node device is not a parent node (i.e. child node only) the forwarding message manager 2908 is adapted to send the outgoing message according to the incoming message to another node device of the same ring network level according to the registry 2904.

According to one embodiment, the network node device further has a device application 2910 adapted to add packet data to the incoming message or retrieve packet data from the incoming message. The packet data could be indicative of a variety of information such as an electrical consumption quota, a temperature table of the other nodes, a battery charge level, an electrical production level of a supply or even a multimedia file to be shared.

Figure 30:
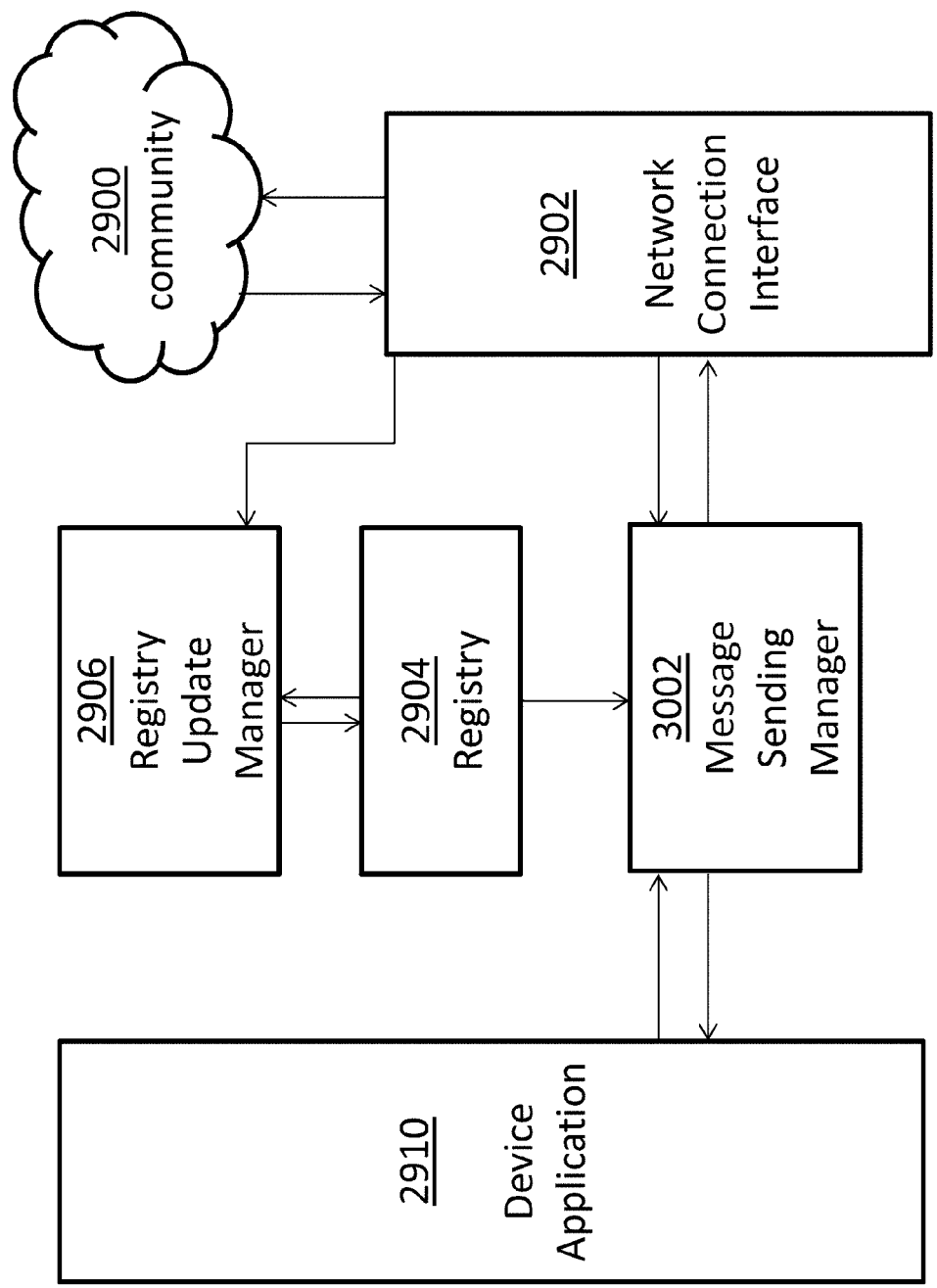
FIG. 30 is a block diagram representing the modules of a node, according to one embodiment.

According to yet another embodiment, the network node device has a message sending manager 3002, as presented in FIG. 30. The message sending manager 3002 is adapted to send a message by unicast, multicast or broadcast. When unicasting, the message is sent to another node device of the community according to the registry. When multicasting, the message is sent to a group of node devices, each of the group of node devices having a same parent node (or same parent node at lower levels) at a determined ring network level. In one example, when multicasting, the message is sent to a group of node devices, each of the group of node devices having a same parent node (or same parent node at lower levels) and being at a ring level that is lower than a predetermined ring level that is lower than p−1. In another example, when multicasting the message is sent successively from a descendent node to a parent node up to a level 0 parent. When broadcasting, the message is sent to all the node devices of the community.

Note that for the above, the n and p values may be determined according to an acceptable maximum number of hops required for a circular broadcast or a direct broadcast. The n and p values may also be determined according to an acceptable neighboring table size, the number of acceptable nodes affected from a disconnected parent node or an acceptable probability of losing all the nodes of a same ring.

What is claimed is:

1. A network node device for communicating with other node devices of a same community within an overlay network topology system having a plurality of node devices organized in a number of p hierarchically linked ring network levels, where p ranges from 0 to p−1, and the plurality of node devices of a same ring being interconnected in groups of n node devices, where n ranges from 0 to n−1, one of the n node devices being a parent node for linking the n node devices of a first ring to node devices of a second ring at another hierarchy by being a parent node to at least the second ring, the network node device comprising:

a network connection interface to communicate over an interconnected network of node devices, the interface being related to a network address;

a registry of connectable node devices adapted to store node device network address and identifiers each representing a node device of the community and each being indicative of the ring network level and ring network position of the corresponding node device according to the overlay network topology;

a registry update manager adapted to modify the registry for handling a change in the community due to drops, adds and moves of node devices that affect the registry; and a forwarding message manager adapted to receive an incoming message via the network connection interface and to handle the incoming message in accordance with a content of the incoming message and the registry, wherein, when the network node device is a parent node, the forwarding message manager is adapted to send an outgoing message containing content from the incoming message to a plurality of node devices of the registry, each having a node position on a different one of the rings that are linked by the network node device, when the network node device is not a parent node, the forwarding message manager is adapted to send the outgoing message according to the incoming message to another node device of the same ring network level according to the registry.

2. The network node device of claim 1, further comprising a device application adapted to add data to the incoming message or retrieve data from the incoming message.

3. The network node device of claim 2, wherein the device application is adapted to determine a replacement node device according to the registry when there is a detected a drop of a node device in the community.

4. The network node device of claim 2, wherein the device application is adapted to determine a new parent node device according to the registry when there is a detected a drop of the parent node device in the community.

5. The network node device of claim 2, wherein the device application is adapted to determine a replacement node device according to a registry of the dropped node device.

6. The network node device of claim 1, wherein the registry of connectable node devices is a table having n columns and p rows.

7. The network node device of claim 1, wherein the registry of connectable node devices has n×p positions each being adapted to store the node device network address and the identifier.

8. The network node device of claim 7, wherein the identifier is a position of the n×p positions and each of the n×p positions is indicative of a ring level and node position within the community.

9. The network node device of claim 1, wherein the registry of connectable node devices comprises a node device of the community that is a parent node to the network node device and a node device of the community that is a next neighbour.

10. The network node device of claim 9, wherein the next neighbour is a node device of a same ring as the network node device.

11. The network node device of claim 1, wherein the registry of connectable node devices comprises all node devices of a same ring as the network node device and a parent node to the network node device.

12. The network node device of claim 1, wherein the registry of connectable node devices comprises parent nodes of all ring network levels hierarchically corresponding to the network node device.

13. The network node device of claim 1, being adapted to communicate with a server, the server being adapted to determine a replacement node device when there is detected a node device drop in the community.

14. The network node device of claim 13, wherein the server is a node device of the community.

15. The network node device of claim 1, wherein the replacement node device is determined according to a ping test result.

16. The network node device of claim 1, further comprising a message sending manager that is adapted to send a message by unicasting the message to another node device of the community according to the registry.

17. The network node device of claim 1, further comprising a message sending manager that is adapted to send a message by multicasting the message to a group of node devices, each of the group of node devices having a same parent node at a determined ring network level.

18. The network node device of claim 1, further comprising a message sending manager that is adapted to send a message by broadcasting the message to all the node devices of the community.

19. The network node device of claim 1, wherein the message is sent to all the node devices of the registry according to a directional ring path that is either counter clockwise or clockwise as defined by the registry of each node device by which the message passes.

20. The network node device of claim 1 further comprising, a load management controller for collecting a local data indicative of at least a local need parameter, for receiving a community data indicative of at least one of a power grid supply parameter or a community need parameter of the other node devices of the community and for determining and setting a power consumption of a corresponding load according to the local data and the community data.

* * * * *